US 8,559,930 B2

(12) United States Patent
Thorn et al.

(10) Patent No.: US 8,559,930 B2
(45) Date of Patent: ＊Oct. 15, 2013

(54) OCCASIONAL ACCESS TO A WIRELESS NETWORK

(75) Inventors: David Thorn, London (GB); Stephen Parsons, Bath (GB); Stuart Cochran, Bath (GB)

(73) Assignee: Evolving Systems, Inc., Englewood, CO (US)

( * ) Notice: Subject to any disclaimer, the term of this patent is extended or adjusted under 35 U.S.C. 154(b) by 622 days.

This patent is subject to a terminal disclaimer.

(21) Appl. No.: 12/766,115

(22) Filed: Apr. 23, 2010

(65) Prior Publication Data

US 2010/0273462 A1    Oct. 28, 2010

Related U.S. Application Data

(60) Provisional application No. 61/184,597, filed on Jun. 5, 2009, provisional application No. 61/172,350, filed on Apr. 24, 2009.

(51) Int. Cl.
*H04W 4/00*    (2009.01)

(52) U.S. Cl.
USPC ........ 455/414.1; 455/419; 455/420; 455/551; 455/432.1; 455/433; 705/34; 370/241; 370/248; 370/340; 370/475

(58) Field of Classification Search
USPC ........ 455/404.1, 404.2, 414.1, 418, 419, 420, 455/432.1, 432.2, 432.3, 433, 435.1, 435.2, 455/445, 456.1, 461, 463, 466, 550.1, 551, 455/552.1, 558; 381/70; 345/156, 163; 713/189, 323, 310, 324; 705/34
See application file for complete search history.

(56) References Cited

U.S. PATENT DOCUMENTS

| | | | |
|---|---|---|---|
| 5,887,253 A | 3/1999 | O'Neil et al. | |
| 6,014,561 A | 1/2000 | Mölne | |
| 6,167,251 A | 12/2000 | Segal et al. | |
| 6,226,517 B1 * | 5/2001 | Britt et al. | 455/445 |
| 6,591,098 B1 | 7/2003 | Shieh et al. | |
| 6,603,968 B2 * | 8/2003 | Anvekar et al. | 455/433 |

(Continued)

FOREIGN PATENT DOCUMENTS

| | | |
|---|---|---|
| EP | 1703760 A2 | 9/2006 |
| KR | 10-2001-0033025 A | 4/2001 |

(Continued)

OTHER PUBLICATIONS

Patent Cooperation Treaty (RO/US), International Search Report of the International Search Authority mailed Nov. 30, 2010, 3 pages, PCT/US2010/032200 filed Apr. 23, 2010.

(Continued)

*Primary Examiner* — Mahendra Patel
(74) *Attorney, Agent, or Firm* — Kilpatrick Townsend & Stockton LLP

(57) ABSTRACT

Tools and techniques for activating a wireless device on a wireless network and/or for providing a wireless device with occasional access to a wireless network. In an aspect, such tools can provide a wireless device with a temporary addressing number to allow the wireless device to send data to the network; this temporary addressing number, then, can be recycled to be used by another wireless device for accessing the network.

9 Claims, 13 Drawing Sheets

(56) References Cited

U.S. PATENT DOCUMENTS

| | | | |
|---|---|---|---|
| 6,680,601 B2 | 1/2004 | Wallgren | |
| 6,836,651 B2 | 12/2004 | Segal et al. | |
| 7,197,301 B2 | 3/2007 | Netanel | |
| 7,266,371 B1 * | 9/2007 | Amin et al. | 455/419 |
| 7,274,928 B2 | 9/2007 | Netanel et al. | |
| 7,289,805 B2 * | 10/2007 | Tom et al. | 455/432.1 |
| 7,386,302 B2 * | 6/2008 | Riffe et al. | 455/417 |
| 7,424,442 B2 * | 9/2008 | Wong et al. | 705/14.68 |
| 7,444,148 B1 | 10/2008 | Cook | |
| 7,991,394 B2 * | 8/2011 | Gonen et al. | 455/432.1 |
| 8,145,212 B2 | 3/2012 | Lopresti et al. | |
| 2001/0029182 A1 | 10/2001 | McCann et al. | |
| 2002/0094808 A1 | 7/2002 | Tiedemann, Jr. et al. | |
| 2002/0177440 A1 * | 11/2002 | Mukherjee | 455/433 |
| 2003/0031305 A1 | 2/2003 | Netanel et al. | |
| 2003/0119490 A1 | 6/2003 | Mohammed | |
| 2003/0129948 A1 | 7/2003 | Gab et al. | |
| 2003/0166398 A1 | 9/2003 | Netanel | |
| 2005/0020234 A1 | 1/2005 | Iivari et al. | |
| 2005/0181793 A1 | 8/2005 | Netanel | |
| 2006/0035631 A1 | 2/2006 | White et al. | |
| 2006/0143098 A1 | 6/2006 | Lazaridis | |
| 2006/0205434 A1 | 9/2006 | Tom et al. | |
| 2007/0300294 A1 | 12/2007 | Netanel et al. | |
| 2008/0026740 A1 | 1/2008 | Netanel | |
| 2008/0057935 A1 | 3/2008 | Netanel et al. | |
| 2008/0081592 A1 | 4/2008 | Das et al. | |
| 2008/0220740 A1 | 9/2008 | Shatzkamer et al. | |
| 2009/0011759 A1 | 1/2009 | Alperovich et al. | |
| 2009/0025070 A1 | 1/2009 | Netanel et al. | |
| 2009/0067408 A1 | 3/2009 | Leppainen et al. | |
| 2009/0109987 A1 | 4/2009 | Kampmann et al. | |
| 2009/0149175 A1 | 6/2009 | Lopresti et al. | |
| 2010/0009659 A1 | 1/2010 | Netanel et al. | |
| 2010/0159924 A1 | 6/2010 | Lagerman et al. | |
| 2012/0094633 A1 | 4/2012 | Parsons et al. | |
| 2012/0094634 A1 | 4/2012 | Parsons et al. | |

FOREIGN PATENT DOCUMENTS

| | | |
|---|---|---|
| KR | 10-2005-0033956 A | 4/2005 |
| KR | 10-2006-0135003 A | 12/2006 |
| WO | WO 00-21275 A1 | 4/2000 |
| WO | WO 01-60092 A2 | 8/2001 |
| WO | WO 01-60092 A3 | 8/2001 |
| WO | WO 02-058361 A2 | 7/2002 |
| WO | WO 02-058361 A3 | 7/2002 |
| WO | WO 2008-118638 A1 | 10/2008 |

OTHER PUBLICATIONS

Patent Cooperation Treaty (RO/US), International Search Report and Written Opinion of the International Search Authority, Jan. 7, 2009, 10 pages, Int'l Patent Appl. No. PCT/US2008/082484 filed Nov. 5, 2008.

International Search Report and Written Opinion of PCT/US2011/051464 mailed on Feb. 23, 2012, 8 pages.

International Search Report and Written Opinion of PCT/US2011/051456 mailed on Apr. 17, 2012, 9 pages.

* cited by examiner

OCCASIONAL ACCESS TO A WIRELESS NETWORK

CROSS-REFERENCES TO RELATED APPLICATIONS

This application claims priority to Provisional U.S. Patent Application No. 61/184,597 filed Jun. 5, 2009, entitled "Occasional Access to a Wireless Network" and Provisional U.S. Patent Application No. 61/172,350 filed Apr. 24, 2009, entitled "Occasional Access to a Wireless Network."

This application is also related to U.S. patent application Ser. No. 12/197,396 filed Aug. 25, 2008 by Lopresti et al., entitled "Wireless Device Activation," which claims priority to Provisional U.S. Patent Application No. 60/992,913 filed Dec. 6, 2007 by Lopresti et al. and entitled "Wireless Device Activation."

The entire disclosures of all of the aforementioned Provisional and Non-Provisional U.S. patent applications are hereby incorporated by reference, for all purposes, as if fully set forth herein.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to wireless telephone networks, and more particularly, to tools for provisioning, activating and/or providing communication with wireless devices, including without limitation telemetry devices on such networks.

BACKGROUND OF THE INVENTION

In order to operate on a wireless network, a wireless device (which can include, but is not limited to a wireless phone) generally must be a subscriber on the network, neglecting for cases in which a wireless devices operates in a roaming mode on a foreign network. To identify the device to the network as a subscriber, a wireless provider generally undertakes a practice referred to herein as "activation," in which the phone is identified to the network using an identifier (such as an international mobile subscriber identifier ("IMSI") or similar identifying number, which, in many cases, is encoded on a subscriber identity module "SIM" in the wireless device). In a general sense, this process involves creating, in a home location register ("HLR"), a record for the device; in some cases, the record comprises the identifying number, as well as an addressing number (e.g., a phone number for a wireless phone), such as an international ISDN number ("MSISDN") or similar number. This record identifies the device to the network and provides information about the capabilities of the device. Without such a record in an HLR, the device generally will be inoperable on the wireless network.

With the recent trend toward "smart" devices that have the need and/or ability to communicate with other devices has arisen a need to provide communication infrastructure for such devices. There are several possible solutions to address this need. One possibility is wired connectivity; however, wired solutions tend to be cost-prohibitive. Some wireless solutions (e.g., WiFi, Bluetooth, etc.) are feasible in certain circumstances yet lack the transmission range to be truly effective in every situation.

Merely by way of example, one potential application of such smart devices is in situations in which telemetry data needs to be transmitted to a central data collector, such as in the case of "smart" utility meters and the like. Typically, such devices will need to send data to a data collector that may be many miles from the utility meter, and technologies such as Bluetooth and WiFi provide insufficient transmission range to support such an application.

Wireless telephone networks, however, can provide virtually unlimited range because as long as the smart device is within a transmission cell, the device can communicate via the public switched telephone network ("PSTN") with any data collector that has connectivity with such a network (either directly, through the Internet, etc.). Such devices, however, typically need only sporadic access to communication capabilities, and provisioning such devices with permanent identifiers (such as permanent MSISDN) is a relatively inefficient use of such resources.

Accordingly, there is a need for more robust techniques for activating wireless devices on wireless networks, and/or for permitting occasional use of a wireless network by wireless devices without permanently committing scarce resources to such devices.

BRIEF SUMMARY OF THE INVENTION

In one aspect, embodiments of the invention provide tools and techniques that can be used to activate a wireless device on a wireless network and/or to provide intermittent access by a device to a wireless network. Beneficially, in accordance with some embodiments of the invention, a unactivated wireless device (that is, a Wireless device that generally would be inoperable on a wireless network) can be given limited functionality in order to activate itself on the network and/or to access the network on an occasional basis (including, for example, to send data using the network).

Merely by way of example, in a set of embodiments, a wireless device (or, more specifically, in some cases a SIM card installed in a wireless device) is assigned a special IMSI number, which is part of a pool of reserved IMSI numbers. In such embodiments, a specialized detection device is provided in the wireless network, and the network is configured to recognize the detection device as the HLR for each IMSI number in the pool of reserved IMSI numbers. Hence, in an aspect, when the device attempts to register on the network (e.g., when the wireless devices attempts to engage in an occasional communication session with a data collector), the network will query the detection device for data pertaining to the phone.

In an embodiment, however, rather than serving as a conventional HLR, the detection device will recognize the special IMSI and assign a temporary addressing number (e.g., a temporary MSISDN) from a reserved pool of such numbers. This temporary addressing number can be used to address the wireless device as needed for the duration of the communication session. This temporary addressing number and/or the special IMSI may be associated with a limited set of capabilities (such as SMS send/receive, etc.) that can be used for data exchange between the wireless device and the data collector. In some cases, the wireless device will send data, while in others, the wireless device might receive data as well. Merely by way of example, in the smart meter context, the wireless device might receive instructions on when it should next attempt to transmit data, or if a homeowner associated with the smart meter has failed to pay his bill, the wireless device might receive data that instructs the smart meter to stop providing the metered utility as a result of the non payment. The smart reader may also receive data that instructs the smart meter to start providing the metered utility such as when the homeowner catches up on past balances or when a new homeowner moves in. Additionally, the wireless device may receive data related to a service and/or operation the wireless device is monitoring such as the smart meter receiving current pricing information for a utility. When the device has finished its communication session, the temporary addressing number can be returned to the pool of such numbers. The next time the wireless device attempts to register with the wireless network, it can be assigned another temporary addressing number (which might be, but need not be, the same as the first assigned temporary addressing number). In this way, certain embodiments can support a relatively large number of such wireless devices with a relatively small pool of temporary addressing numbers, resulting in more efficient use of this scarce resource.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, one set of embodiments provides methods for providing a wireless device with occasional access to a wireless network. An exemplary method might comprise assigning a first identification number to the wireless device; the identification number might fall within a pool of known identification numbers, and/or the wireless device might not be activated as a subscriber on the wireless network. The method might further comprise providing, in the wireless network, a detection device configured to identify the wireless device and/or configuring the wireless network to identify the detection device as a quasi-home location register for the block of known identification numbers. In some cases, the method further comprises receiving, at the detection device, a query, from a component of the wireless network, for data pertaining to the, wireless device. The method might also include assigning, at the detection device, a temporary addressing number to the wireless device and/or, in response to the query, providing to the component of the wireless network the temporary addressing number. The method, in some cases, further comprises receiving data from the wireless device and/or un-assigning the temporary addressing number after the data has been received from the wireless device.

Another exemplary method for providing a wireless device with occasional access to a wireless network might comprise assigning an IMSI number to the wireless device; the IMSI number might fall within a pool of known IMSI numbers, and/or the wireless device might not be activated as a subscriber on the wireless network. The method might further comprise providing, in the wireless network, a detection device configured to identify the wireless device, and/or configuring the wireless network to identify the detection device as a quasi-home location register for the block of known IMSI numbers;

The method might further comprise receiving, at a base station controller, a message from the wireless device, the message comprising the IMSI number. The method, then can include identifying the IMSI number of the wireless device and/or, based on the identification of the IMSI number, identifying the detection device as a quasi-home location register for the wireless device. In some cases, the method includes receiving, at the detection device, a query from a MSC for data pertaining to the wireless device and/or selecting, from a pool of temporary MSISDNs maintained by the activation system, a temporary MSISDN for the wireless device. The detection device might provide to the MSC, in response to the query, the temporary MSISDN assigned to the wireless device and/or a notification that the wireless device is capable of communicating data over a specified bearer service. The method can further include receiving data from the wireless device, over the specified bearer service and/or returning the temporary MSISDN to the pool of temporary MSISDNs, such that the temporary MSISDN can be selected for another wireless device.

An apparatus in accordance with yet another set of embodiments comprises a first computer readable medium, having encoded thereon a first set of instructions executable by an activation system to perform one or more operations, and/or a second computer readable medium having encoded thereon a second set of instructions executable by a detection device in a wireless network to perform one or more operations. Merely by way of example, the first and second sets of instructions may include, respectively, the instructions described above and/or instructions to perform various procedures of the methods described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
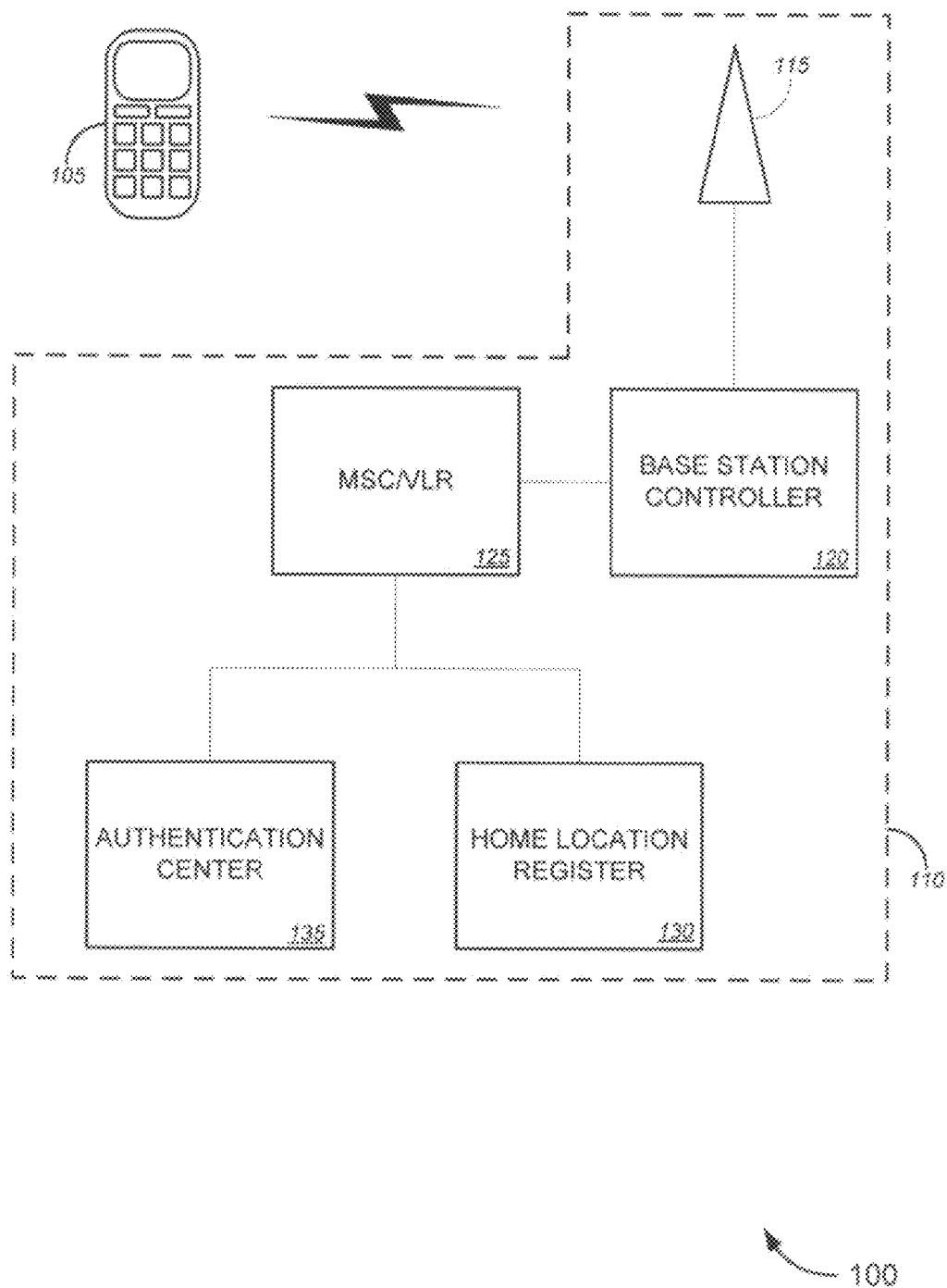
FIG. 1 is a block diagram illustrating a typical relationship between a wireless device and a wireless network.

While aspects of various embodiments have been summarized above, the following detailed description illustrates embodiments in further detail to enable one of skill in the art to practice these embodiments. In the following description, for the purposes of explanation, numerous specific details are set forth in order to provide a thorough understanding of features in accordance with various embodiments. It will be apparent, however, to one skilled in the art that other embodiments of the present invention may be practiced without some of these specific details. In other instances, well-known structures and devices are shown in block diagram form. Several embodiments are described below, and while various features are ascribed to different embodiments, it should be appreciated that the features described with respect to one embodiment may be incorporated with another embodiments as well. By the same token, however, no single feature or features of any described embodiment should be considered essential, as other embodiments of the invention may omit such features.

In an aspect, sonic embodiments provide tools to allow a wireless device to act as the vehicle for its own activation in a wireless network (activation scenario) and/or to provide a wireless device occasional access to a wireless network without requiring the wireless devices to be provisioned with a permanent address number (occasional access scenario). In the activation scenario, a temporary MSISDN may be assigned to the wireless device until the wireless device is provisioned with a permanent MSISDN. In the occasional access scenario, an MSISDN may be assigned (e.g., form a reserved pool of such resources) to a wireless device whenever the wireless device attempts to register on the network. By recycling resources in this way, these embodiments can avoid the need to provision each such device with dedicated identifiers (either before activation or for occasional access devices) and therefore can provide enhanced economy in the use of these valuable resources.

As used herein, the term "wireless device" is used to mean any type of device that operates by access to a wireless network and requires activation to be operable. Such devices include wireless phones, as well as connected personal digital assistants, portable email devices, and/or the like. In particular embodiments, a wireless device might be a "telemetry device." As used herein, the term "telemetry device" should be interpreted broadly to include any device that is required to occasionally report to a centralized logging and monitoring system.

Examples of telemetry devices would include what are sometimes called "smart meters" where the meter records the consumption of electricity, natural gas, water, etc. in domestic or industrial premises. Another example could be a vending machine that records the consumption of goods from it. It should be noted, of course, that the recording and reporting of consumption is just one use case, and that others are possible as well. For example, the vending machine could also report faults, power outages, even attempted break-ins (assuming some sort of detector would be tripped by such an attempt). A further example is a device in a car that reports when a car has broken down or has been involved in an accident. A further example is a device that is placed proximate to a well site, such as an oil well, that monitors and/or records operations at the well site such as conditions of the well and/or the machinery that pumps fluids and/or extracts fluids from the well. For example, the device could monitor various variables related to the machinery that pumps and/or extracts fluids from the well (e.g. fluid pressure, fluid temperature, fluid flow rate, pump strokes per minute, etc.) and occasionally access the wireless network to provide this information to a centralized database. The wireless device, in such cases, could be manufactured in the enclosing equipment (e.g., a smart meter, vending machine, car, well site, etc.), could be an embeddable module (consisting of wireless radio module, etc.), or could be added aftermarket, and could be a field replaceable unit (FRU), and/or could be an adjunct unit connected to the associated equipment.

Additionally, a wireless device may be provided to one or more pieces of machinery and/or equipment to allow communication between the machinery and/or equipment. The machinery and/or equipment may be involved in a similar process and/or involved in producing a similar product and the communication may include information about the process and/or product. Such communication may result in increased efficiency, reliability, and quality of a process and/or product. Additionally, such wireless devices may be incorporated into an entire assembly process so that information is automatically communicated between machinery and/or pieces of equipment in the assembly process. In some embodiments, the various pieces of machinery and/or equipment may be located at remote locations. For example, one piece of machinery may perform a manufacturing operation on a product and report manufacturing variables (e.g. tool wear, temperature, etc.) to machinery further down the process line so that the machinery may adjust to the manufacturing conditions and/or so that the manufacturing process can be monitored and recorded. This type of arrangement may eliminate the need for such information to be manually recorded and/or entered into various pieces of machinery and may eliminate potential errors associated therewith.

In one aspect, such devices may operate on what is sometimes referred to as a "wide area cellular" network, including without limitation a Global System for Mobile telecommunications ("GSM") network, a code division multiple access ("CDMA") network, and/or networks operating in accordance with any derivatives thereof (such as General Packet Radio Service ("GPRS"), Enhanced Data rates for GSM Evolution ("EDGE"), Circuit Switched Data (CSD), High Speed Circuit Switched Data (HSCSD), CDMA2000, Universal Mobile Telecommunications Standard ("UMTS"), Wideband-CDMA ("W-CDMA") High Speed Packet Access ("HPSA"), and Evolution-Data Optimized ("EVDO") technologies, among others). Additionally, the wireless devices may operate on outdated/legacy networks (e.g. 2G network, etc.) that otherwise may have limited commercial value. Such networks may provide sufficient and necessary functionality especially in the occasional access scenario where the devices only occasionally access the network and may even then only require limited functionality (e.g. SMS, USSD, etc.). Providing occasional access on outdated/legacy networks, on which access may be available at a reduced price compared to other networks, may also provide network operators with additional revenue for networks with otherwise limited commercial value.

Beneficially, certain embodiments may overcome many of the deficiencies of conventional wireless device provisioning techniques. Merely by way of example, an aspect of some embodiments enables a wireless provider to streamline its supply chain and allows more efficient utilization of wireless resources (including without limitation, network equipment, SIMs, MSISDNs, IMSI numbers, and the like) by foregoing the need to preallocate and/or preactivate IMSI numbers and/or MSISDNs at early points in the supply chain, instead allowing for IMSI/MSISDN allocation on a temporary or as needed basis and/or for activation after the purchase of the wireless device by the end user. Hence, some embodiments allow just-in-time provisioning of SIMs and/or numbers.

In some embodiments involving the activation scenario, the tools and techniques described herein can be used to activate wireless devices under many difference scenarios including activating wireless devices in a prepaid environment (in which a user pays in advance for the use of the device on a wireless network) and/or in a postpaid environment (in which a user pays, typically on a periodic basis, for the use of the device over a preceding period, typically on a per-minute or flat-rate per month basis).

In another aspect, some embodiments provide an improved experience for the end user in provisioning a wireless device with a permanent addressing number. Merely by way of example, in accordance with some embodiments, the user can purchase a phone (or other wireless device) at a convenient location (which need not be a dedicated wireless reseller with activation facilities) and yet forgo the traditional need to access a secondary telephone or computer to activate a device purchased under such circumstances.

In one set of embodiments, a detection device (which is also referred to herein as a "first use register" or "FUR"), can be used to enable such functionality. In an aspect of certain embodiments, the detection device (FUR) is responsible for receiving the MAP messages from the MSC/VLR that the wireless device is attached to in order to detect the first use of the wireless device and for carrying out the MAP message processing to allow the wireless device to be activated and to attach to the wireless network (e.g. sending profile to VLR, proxying authentication messages to authentication center, processing USSD messages from the device, etc.), as described below, for example.

In an embodiment involving the occasional access scenario, a wireless device (such as a telemetry device) connects to the wireless network occasionally to send data (e.g., using one or more SMS messages and/or any other appropriate data transport) to a data collector (which might be associated with a utility, a vending machine operator, a roadside assistance service, a well site, and/or the like, depending on the nature and/or use of the wireless device), such as a centralized logging and monitoring system. The timing on which the wireless device sends data is discretionary; for example, the wireless device might send data according to some schedule (that it manages), when some event occurs (e.g. one or more detectors or other instruments in the associated equipment trigger the device), or even if an end user instructs the equipment to report data (e.g. they press a button on the equipment or device that causes it to report data). Other triggers are possible as well. In an aspect of certain embodiments, the wireless device, and not the detection device (FUR) or the data collector (or any other network component) is responsible for determining when the wireless device connects to the network to send data. It should also be noted that the bearer service for reporting data to is not limited to SMS message; it could equally be a USSR message, data transmission using a wireless data bearer (GPRS, EDGE, EVDO, HSPA, CSD, HSCSD, etc.), a voice call, or any other suitable service.

In a beneficial aspect of some embodiments, these and other features may be provided through the manufacture of SIMs with temporary and/or special IMSI numbers in specified ranges In a particular aspect, these IMSI numbers may not be associated with any subscriber information in the serving operator's network. Rather than routing communications from devices with these temporary/special IMSI numbers to core network equipment (such as HLRs, authentication centers, and/or the like), the serving operator's network may be configured to route these communications to a detection device (FUR) that operates in accordance with methods provided by various embodiments. The serving operator's network may also be configured to identify this detection device as a quasi-HLR for the specified range of temporary/special IMSI numbers. (It should be noted that this "range" of temporary/special IMSI numbers need not be a contiguous range—any appropriate technique may be used to identify these temporary IMSI numbers and/or distinguish them from "normal" IMSI numbers that arc used for conventional communications with a wireless device).

Merely by way of example, in a set of embodiments, when a serving operator's network receives an initial registration message from a device assigned one of these temporary/special IMSI numbers, it then may forward this message to a detection device, which selects a temporary MSISDN number for the SIM and provides a profile for the wireless device to the serving operator's network (and/or more particularly, the appropriate equipment, such as a visited location register and/or visited mobile switching center). This profile, which contains the temporary MSISDN number, provides the wireless device with sufficient access to the serving operator's network to complete the activation process and/or to establish an appropriate communication session. Merely by way of example, many telemetry devices require only relatively simple data communications ability to perform their functions; for such devices, the profile might merely specify that the wireless devices is capable of sending and/or receiving SMS messages. Of course, depending on the embodiment, rather than supporting SMS messages, the profile could just as easily support communications via USSD messages, data transmission using a wireless data bearer (GPRS, EDGE, CSD, HSCSD, EVDO, HSPA, etc.), a voice call, or any other suitable service.

The detection device (FUR), in accordance with some embodiments, provides sufficient signaling support to allow the serving operator's network to register and manage the wireless device. Merely by way of example, in some cases, the detection device may be configured to forward any authentication requests from the serving operator's network (and/or any devices therein) to an appropriate authentication center; in an aspect, however, the detection device may also operate to provision the security keys at the authentication center before forwarding the authentication request.

In some embodiments involving the activation scenario, the detection device (FUR) may also be configured to notify an activation system that a wireless device with a temporary IMSI has registered with the network. The activation system, then, may assign a permanent MSISDN to the wireless device (based, perhaps, on an interaction between the user and the activation system) and/or may assign a permanent IMSI number to the SIM card in the wireless device. The activation system may also create, in the serving operator's core network equipment (e.g., home location registers, authentication centers, etc.) appropriate records comprising the permanent MSISDN and IMSI number. The temporary MSISDN then may be returned to the pool for re-use by the detection device in another activation procedure.

In some embodiments involving the occasional access scenario, after the temporary MSISDN has been assigned and a profile exists in the MSC permitting some limited set of functionality (e.g., in accordance with certain embodiments. Terminating and Originating SMS messages, and/or any other bearer service set appropriate for the selected data transmission technique), the wireless device can then send its SMSs (and/or using any other appropriate bearer service for the data to be transmitted). Merely by way of example, the detection device (FUR) might be configured to respond to Anytime Interrogations or Send Routing Information for Short Message requests that a short message service center ("SMSC") may raise during this process. In some embodiments, the detection device may respond to Anytime Interrogations by providing a cell tower location and/or other characteristics of the wireless device.

Alternatively or additionally, to route SMS messages, the detection device (FUR) may be configured to perform one or more functions of the SMSC and/or may map or otherwise associate an MSISDN to and/or from an identifier associated with the wireless device. Such mapping maybe particularly useful in instances where information is sent to a wireless device after the MSISDN has been recycled as described below (i.e. a traditional SMSC routing process may not be able to route SMSs because the MSISDN has been recycled and is no longer associated with the wireless device). The map may provide a link between an MSISDN previously associated with a wireless device and an MSISDN currently associated with the wireless device to facilitate routing of any SMSs that were not previously received and/or any messages that may have been sent after the MSISDN was recycled. The identifier may be any identifier associated with the wireless device including, for example, the special IMSI, a smart meter number, a weather station identifier, a well site location number and/or address, a car license plate number, etc.

After the data has been transmitted, the detection device (FUR) can then recycle the MSISDN (e.g., on a configurable timer sufficient for this process to complete). With this approach, the occasional use SIMs never require a real HLR entry and do not permanently consume an MSISDN. A pool of MSISDNs within the detection device (FUR) is all that is required. In an aspect, such a pool might comprise several hundred or several thousand MSISDNs and could support many times that number of wireless devices requiring occasional access.

In some cases, it may be necessary for there to be an entry for the SIM (i.e., for the wireless device) in the authentication center to allow the wireless device to be authenticated with the network. In such a scenario, there are several possible techniques for providing such an entry. Merely by way of example, in one embodiment, authentication center entries are created for each special IMSI (and hence SIM card in the wireless device identified by that special IMSI value and with an associated encryption key, such as a Ki) in advance (e.g. when the SIM card is manufactured). In another embodiment, the authentication center entries are not created in advance. In the former case, authentication MAP messages can be forwarded to the authentication center without the detection device (FUR) needing to do anything. In the latter case, when the detection device receives the authentication message from the network, it holds the message while it provisions the authentication center, and it then forwards the message to the authentication center for a response. In accordance with yet another embodiment, the detection device might itself act as the authentication center itself, such that there is no need to either pre-provision (in the first case) or just-in-time provision (in the second case) a "real" authentication center. Other techniques are possible as well.

In sonic cases, the detection device may provide and/or make available (e.g., over an API) the information reported by the wireless device, if that data is received by the detection device. This functionality may depend on a number of factors, including without limitation the bearer service used. For example, if the wireless device reports data using SMS messages and these are sent to a SMSC, then the data may be made available from the SMSC, rather than the detection device, to a data collector. However, one option is that the detection device itself supports the receipt of SMS messages that are originated from the wireless device (and/or provides the data to a data collector, either directly, through an SMSC, etc.). Similarly, if the wireless device originates USSR messages, these could be received by the detection device and/or passed on as appropriate. If the detection device supports the receipt of SMS (or USSD, etc.) messages itself then the use of a timer to recycle the temporarily-assigned MSISDN (as described above) may be unnecessary—the detection device can recycle the MSISDN (i.e., return the MSISDN to the pool of available temporary MSISDNs) and purge the VLR when the dialogue is complete.

FIG. 1 illustrates a typical arrangement 100 of a wireless device 105 (the term "wireless device" should be interpreted to include any type of wireless device, including without limitation telemetry devices and wireless devices) and wireless network 110, which may include one or more of a wireless intelligent network ("WIN"), a signaling system 7 ("SS7") network, a public switched telephone network ("PSTN"), a data network (such as an Internet Protocol network, which can include the Internet, an Intranet, and/or the like). In the arrangement 100 of FIG. 1, the network 110 comprises (and/or provides communication between) a base station 115, a base station controller (BSC) 120, a mobile switching center 125, a home location register 130, and an authentication center 135. (One skilled in the art will appreciate that the network 110 might include other components, such as a switching service point, intelligent peripheral, etc., and/or or that the network 110 often will comprise multiple base stations 115, base station controllers 120, mobile switching centers 135, home location registers 130 and/or authentication centers 135. Likewise, it is possible that two or more of these components might be integrated in a single device.)

Generally, the wireless device 105 has associated therewith an identification number (which may be, but need not necessarily be, an IMSI, and which may be, but need not necessarily be, stored on a SIM installed in the wireless device 105) that identities the wireless device to the network, and/or an addressing number (which may be, but need not necessarily be, an MSISDN), which is used by the network 110 to address the wireless device 105 when communicating with the wireless device 105.

In normal operation, when an activated wireless device 105 registers with the network (e.g., is powered on, enters the service area, etc.), it sends a message, which is received at the base station controller 120 (usually via the base station 115). The message generally will include the identification number of the wireless device 105, either explicitly or implicitly (e.g., the base station controller 120 will be able to ascertain the identification number and associate it with the message, if necessary.) The MSC 125 (or some other component of the network 110) thus identities the identification number of the wireless device 105 and queries the HLR 130, which returns to the MSC 125 data about the wireless device 105. (While this document, for ease of description, refers to communications between the MSC 125 and other devices, one skilled in the art will appreciate that, in practice, it is often either a visited location register ("VLR"), which, in many cases, is collocated with the MSC 125, the MSC 125 itself and/or some combination thereof, that participates in such communications. Hence, this document sometimes refers to the MSC and VLR collectively, and references herein to operations involving the MSC 125 should be considered to include operations that might involve a VLR as well.) Such data can include the addressing number of the wireless device 105, as well as the capabilities of the wireless device 105.

Typically, a security key is used to secure communications between the wireless device 105 and the network 110. This security key (often implemented as a set of data "triplets" comprising a signed response, session key and a random number) is generated by the authentication center 135, based on a shared secret stored in the wireless device (often referred to as "Ki") and in a record in the authentication center 135. In a typical implementation, the HLR 130 forwards the query (or at least the wireless device's identification number) to the authentication center 135 as well. The authentication center 135 correlates the wireless device's identification number with the shared secret, such that when provided the identification number, the authentication center 135 can generate the security key based on the shared secret for that wireless device and return it to the MSC 125, which can use that data to authenticate the wireless device 105.

Once the MSC 125 has obtained the data from the HLR 130 and authenticated the wireless device 105 based on the security key, the wireless device 105 is operable on the network 110. In this typical implementation, however, the activation process populates the HLR 130 and the authentication center 135 with data about the wireless device 105, including the identification number and shared secret. Hence, if the wireless device 105 has not been activated, neither the HLR 130 nor the authentication center 135 will contain records corresponding to the identification number of the wireless device 105, preventing the wireless device 105 from registering with the network 110 and thus rendering the wireless device 105 inoperable on the network 110. Moreover, this problem is somewhat circular, since, if the wireless device 105 cannot register with the network, there is no way for the wireless device 105 to perform any type of self-activation. As a result, activation generally must be performed using a vehicle independent of the wireless device 105 (such as an activation computer at the location of a dedicated wireless reseller, a voice call to an attendant at a call center, a web-based transaction from a separate computer, etc.).

Figure 2:
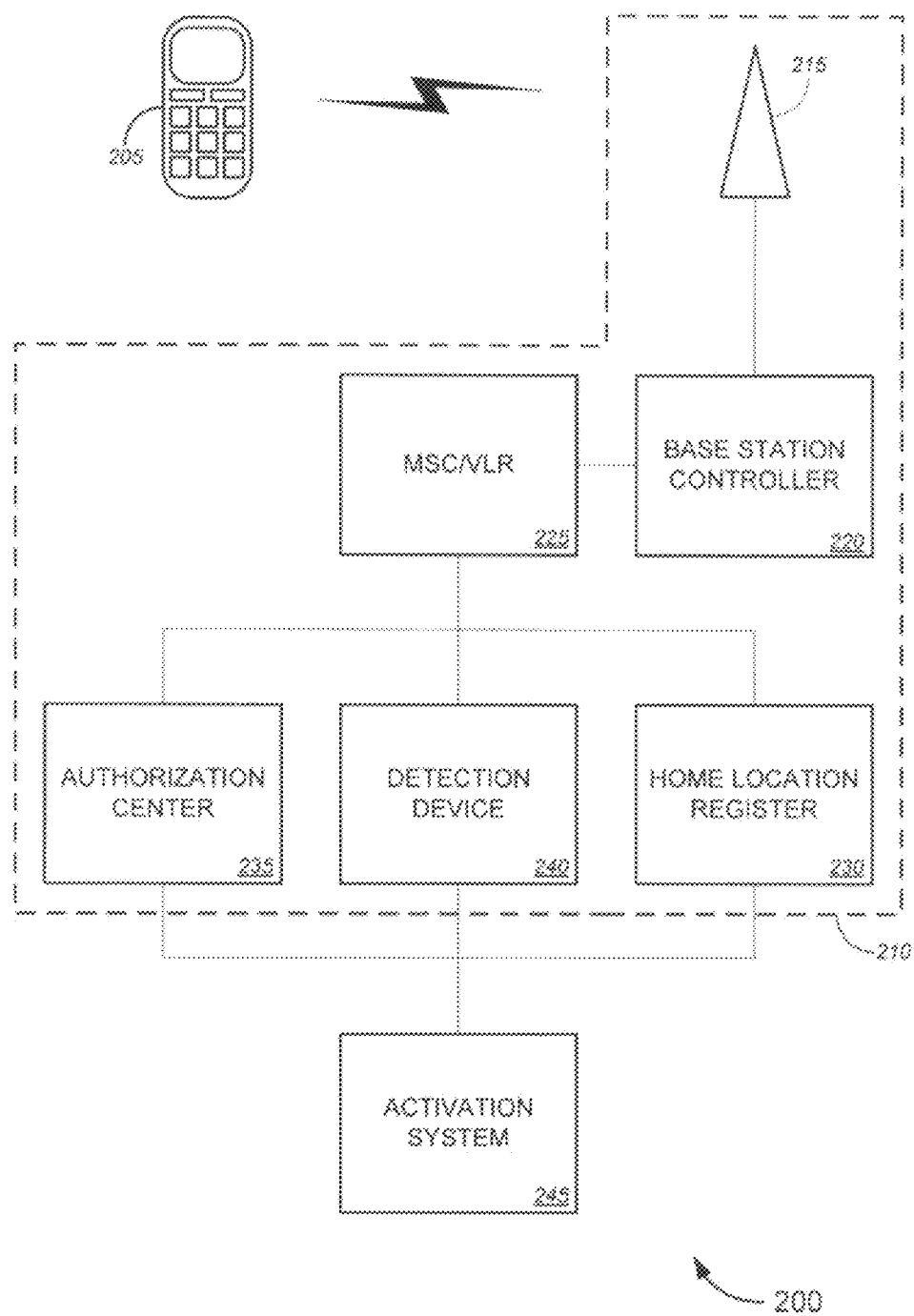
FIG. 2 is a block diagram illustrating an arrangement configured to activate a wireless device, in accordance with various embodiments of the invention.

FIG. 2 illustrates another arrangement 200 between a wireless device 205 and a wireless network 210, in accordance with embodiments of the invention. The arrangement 200 is similar to the arrangement 100 described above, and it operates in similar fashion once the wireless device 205 has been activated. The arrangement 200, however, is configured to allow the wireless device 205 to be the vehicle for its own activation. In accordance with a set of embodiments, in addition to the base station 215, base station controller 220, MSC/VLR 225, HLR 230 and authentication center 135, the arrangement includes a detection device 240 and an activation system 245. (The detection device 240 is also referred to herein as a "first use register" or "FUR".) The detection device 240 can be any device and/or computer system that can be configured to perform the function ascribed herein to the detection device 240. In some cases, the detection device 240 may be implemented by a modified HLR; in other cases, the detection device 240 may be purpose-built from scratch. The activation system 245 can be any computer system and/or device that comprises the necessary configuration and/or software to perform the functions described below to activate the wireless device 205 though the network 210. In one embodiment, the activation system 245 is a single computer; in other embodiments, it may be a group of computers that collectively provide the functionality described herein.

In the illustrated embodiment, the detection device 240 resides within the network 210, while the activation system 245 is outside the network, although the activation system is in communication (either directly or indirectly) with the detection device 240, as well as the HLR 230, authentication center 235 and/or MSC 225. (In various other arrangements, the detection device 240 and/or the activation system 245 may be either inside or outside the network 210 and/or may be in communication, either through the network 210 or otherwise, with various components of the network.)

One mode of operation of the arrangement 200, and in particular the detection device and activation system 245, is described in detail below. In a general sense, however, a set of embodiments provides a detection device that is configured to act as a "quasi-HLR." In other words, the detection device (which is not a HLR 130 and generally does not perform the functions of an HLR 130), is configured to be seen by the network 210—and, in particular the MSC 225—as the HLR for an unactivated wireless device 205. Hence, when the unactivated wireless device 205 attempts to register with the network 210, the MSC 225 queries the detection device 240, rather than the HLR 230, for data about the wireless device 205. The detection device 240, in turn, contacts the activation system 245, which is responsible for assigning an addressing number to the wireless device 205 and, in some cases, assigning a new, permanent identification number to SIM in the wireless device 205 as well. (In which case, the original, temporary identification number can be reused on a different unactivated SIM in the future.) In an aspect, the activation system is also responsible for updating the network 210 to complete activation of the wireless device, as described in further detail below.

Figure 3:
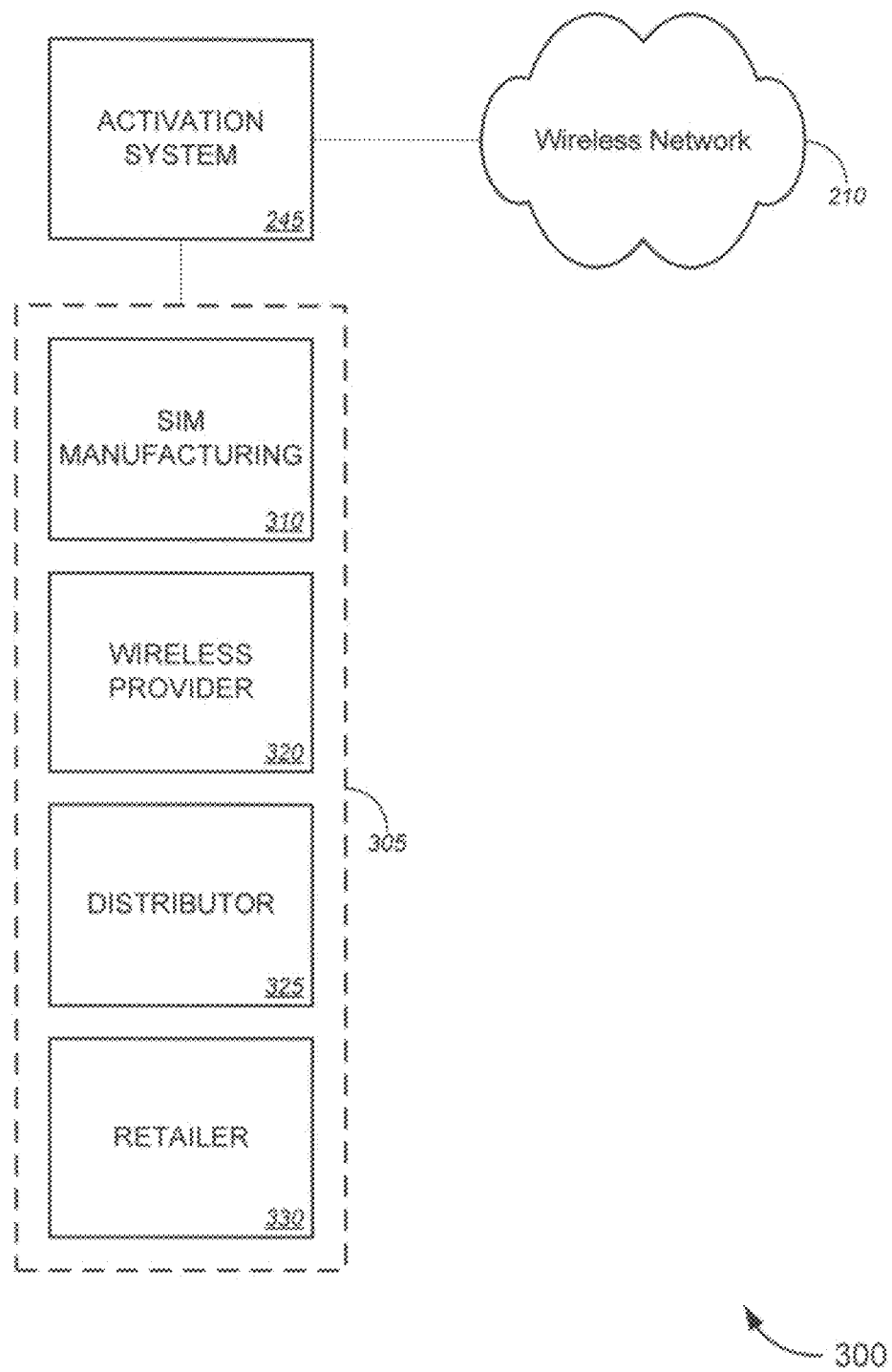
FIG. 3 is a block diagram illustrating a relationship between a device activation provider and a supply chain, in accordance with various embodiments of the invention.

In another set of embodiments, this activation technique forms the basis for a business process that can be used to manufacture and/or distribute SIMs more efficiently, and/or to monetize the number selection process. FIG. 3 illustrates a relationship 300 between the activation system 245 and a supply chain (which might also be considered a sales channel) 305. The supply chain 305 can involve any of a number of entities; as illustrated, the supply chain 305 includes a SIM manufacturing process 210, a wireless provider 320, a distributor 325, and a retailer 330. A retailer can be any of a variety of entities, with a variety of relationships to a wireless provider 320. For example, in some cases, the retailer 330 might be a value-added reseller of wireless devices, while in other cases, the retailer 330 might be a big-box electronic store. In some cases, the retailer might be a general merchandise retailer (such as a grocery store, convenience store, kiosk, etc.). Unlike some traditional activation techniques, embodiments of the invention can support retail sales through virtually any type of retailer.

In various embodiments, the supply chain 305 may contain none, one, or more of each of these types of entities. For example, in a case in which the activation system 245 is operated by the wireless provider (i.e., the wireless telephone company will provide service for the wireless device once activated), the wireless provider might not be considered part of the supply chain. As another example, if the wireless devices/SIMs are rebranded before sale to the end user, there might be multiple wireless providers 320 in the supply chain. (It should be noted as well that any two or more of these entities may be consolidated; for example, the wireless provider 320 may also act as the distributor 325 and/or retailer 330 of wireless devices.)

In the illustrated embodiment, the SIM manufacturing process 310 is at the beginning of the supply chain (although the activation provider might actually be considered the beginning of the supply chain). The SIM manufacturing process 310 is responsible for manufacturing SIMs and/or, more precisely, for encoding the SIMS with identification numbers provided by the activation system 245

The SIMs then can be provided to the wireless provider 320, which distributes them to distributors 325 (and/or directly to retailers 330), either installed in wireless devices or as standalone components to be installed later into wireless devices. A retailer 330, after receiving a SIM/wireless device, sells the wireless device to a user, who can then activate the wireless device as described herein.

As noted above, the activation system 245 (which might be operated by an activation provider, who may be a standalone entity and/or one of the other entities within the supply chain 305, such as the wireless provider 320 and/or SIM manufacturer) may be configured to be in communication with one or more other entities in the supply chain. In an aspect, the activation system 245 might be in communication with these entitie(s) through conventional computer communications (such as by way of a business application, such as a supply chain management application, via specialized software, via a specified data exchange format, such as XML, via human communication, etc.).

The activation system 245, in an aspect, interacts with the SIM manufacturing process to provide a pool of known identification numbers (e.g., IMSI numbers) that can be encoded onto SIMs as temporary identification numbers of unactivated SIMs. The SIM manufacturing process 310 can then produce SIMs, in conventional fashion, encoded with identification numbers from this pool.

The activation system 245 may also interact with the wireless provider (in addition to interacting with the provider's network to activate wireless devices, as described elsewhere herein) to provide status information about the activation process, for example, by notifying the provider 320 of the status of SIMs/identification numbers. The activation system 245 may interact as well with distributors 325 and/or retailers 330 to provide such information, to obtain information about sales of SIMs (and/or devices comprising the SIMs), particularly SIMs having temporary identification numbers.

The activation system 245 (and/or another computer in communication therewith) may track the progress of the SIM through the supply chain/sales channel, either to maintain information about the status of the IMSIs and to prevent supply chain leakage, and/or to identify an entity responsible for the IMSI. For example, if an IMSI is used in a rebranded wireless device, it can be useful to know the provider of the rebranded service, as there may be need to apportion fees and/or account for transaction costs associated with the sale of the wireless device. In one aspect, the activation system 245 (and/or an associated computer) may receive status updates when the status of an IMSI changes, including, for example, when a SIM is encoded with the IMSI, when the SIM is installed in a device, when the device is provided to a distributor 320 and/or retailer 330, when the device is purchased by an end user, etc. Such updates may be provided by the entity responsible for the status of the IMSI at that time and/or may be propagated up the supply chain to the activation system (or associated computer). Standard supply chain and/or sales channel management techniques, communications techniques, and/or software may be used to communicate such information.

In another aspect, the activation system 245 (and/or another aspect of the activation provider) may interact with entities in the supply chain to transfer payments in relation to the activation process. In some embodiments, for example, the activation provider may receive payment from a wireless provider 320 (and/or any of the other entities) for providing activation services. In other embodiments, the activation provider may also make payments to any of these entities, and/or may notify the entities of such payments, amounts owing, etc., via the activation system 245 and/or another system in communication therewith. Merely by way of example, as described below, in some cases, a user will be charged a fee for the ability to have input into the selection. That fee may be charged by the activation provider, and/or a portion of the fee may be allocated to the SIM manufacturer 310, the wireless provider 320, distributor(s) 325, and/or retailer(s) 330. Payment of these portions of the fees, and/or accounting therefore, may be performed by the activation system 245 (and/or another computer in communication therewith). In other cases, the fee may be charged by the wireless provider 320 (or another entity) directly, for example, by adding the fee to the user's invoice for wireless service. In such cases, the activation system 245 might notify that entity of the type of input (as described below, for example) provided by the user in selecting the number (e.g., MSISDN) for the wireless device, so that the wireless provider 320 (or other entity) can properly bill the user. Some of that fee might be allocated to the activation provider as well.

Figure 4:
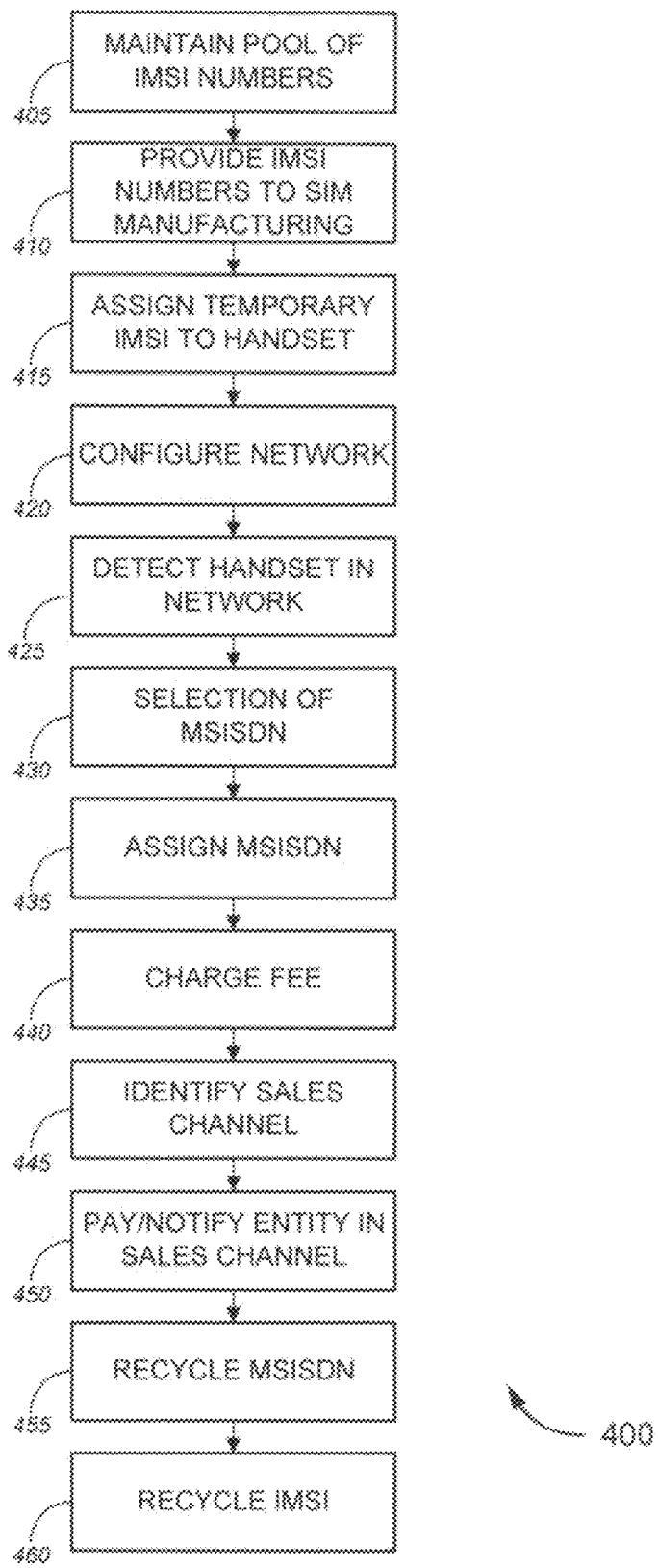
FIG. 4 is a process flow diagram illustrating a business process based on device activation, in accordance with various embodiments of the invention.

To illustrate some of these concepts, FIG. 4 illustrates a business method 400 based on device activation, in accordance with a set of embodiments. In accordance with the method 400, a pool of identification numbers (which is referred to in this discussion as an IMSI for ease of description, but might be any appropriate type of identification number) is maintained, for example, at the activation system (block 405). The pool might, but need not, comprise consecutively-numbered IMSIs. Each of the IMSIs in this pool is known to the activation system, and they are designated by the activation system for use as temporary IMSIs. (The activation system might also maintain another pool of IMSIs to be used as permanent IMSIs, as described in more detail below.) Maintaining a pool of IMSIs can comprise storing the IMSIs in a database accessible to the activation system, keeping a record of the IMSIs, removing used IMSIs from the pool, adding IMSIs to the pool when necessary, and/or the like.

The temporary IMSIs in the pool are provided to a SIM manufacturing process (block 410), which manufactures SIMs encoded with these temporary IMSIs and/or otherwise provides for each of the temporary IMSIs to be encoded and/or stored on a SIM. Each temporary IMSI is thereafter assigned to a wireless device (block 415), for example, by installing a SIM encoded with the IMSI into the wireless device and/or otherwise packaging the SIM with the wireless device. In an aspect, providing the IMSI to be encoded on a SIM, the activation system reserves this temporary IMSI from the pool of available IMSI numbers, so that it cannot be used again (at least until recycled, as described below).

At block 420, the network is configured to accommodate the activation process of the current invention. One method of configuring the wireless network is described in further detail below with respect to FIG. 5. At block 425, a wireless device comprising a SIM with one of the temporary IMSIs is detected by the network, for example, using the process described below with respect to FIG. 6.

An addressing number (which is referred to hereinbelow as an MSISDN, although other types of addressing numbers are possible as well in accordance with embodiments of the invention) optionally may be selected by the user (block 430), for example, using the procedures of FIG. 7, described below. This MSISDN is assigned to the wireless device (or, more precisely the SIM) (block 435), for example, by associating (in the HLR) the MSISDN with the IMSI assigned to the phone, as described further below. In some cases, also as described below, the MSISDN may be provided to the wireless device for the convenience of the user.

Optionally, the user may be charged a fee (block 440), for example, in relation to the activation itself process itself, based on the user's selection of an MSISDN, etc. In some cases, the activation system may be responsible for charging the user a fee, for example, by prompting the user for credit card information (via an interface on the wireless device, etc.) and charging the fee to the credit card identified by the user. In other cases, the fee may be charged by the wireless provider and/or another entity in the supply chain of the wireless device. In other cases, the user may be credited with an initial balance (for example, upon purchasing a SIM and/or wireless device), which may be debited to account for the fee charged to the user. (If the user elects to employ a selection technique that does not require a fee, the initial balance might be credited to the user's prepaid service, credited against a future invoice for service, refunded, etc.)

At block 445, notification is provided to one or more entities in the supply chain for the wireless device (and/or the SIM). This notification can comprise notification that the wireless device has been activated, notification of a type of selection of an MSISDN by the user, and/or the like. In an aspect, the activation system may be used to provide this notification, perhaps via an automated process that does not require user input. The activation system might notify the entities in the supply chain using, for example, any of the communication techniques described above with respect to FIG. 3. In cases where another entity in the supply chain is responsible for charging a fee to the user, this notification can serve as a trigger and/or basis for the fee. In cases in which the activation provider charges a fee, this notification might include a payment and/or accounting corresponding to a portion of the lee owed to various entities in the supply chain.

Beneficially, aspects of certain embodiments allow for the reuse of temporary MSISDNs and/or IMSIs. Hence, for example, if the wireless device is provided a temporary MSISDN during the activation process (as described below), that temporary MSISDN is reserved from a pool of available temporary MSISDNs during the activation process. After the process has been completed, and the wireless device is assigned a permanent MSISDN, the temporary MSISDN can be recycled (i.e., returned to the pool of available MSISDNs) (block 455), so that it is available for future activation procedures with other devices. In this way, the number of temporary MSISDNs needed for the activation processes of the invention can be minimized.

Similarly, once the activation system has confirmed that the wireless device has been activated, if the activation process includes assignment of a permanent IMSI to the wireless device (as described below, for example), the activation system can return the temporary IMSI assigned to the SIM in the wireless device to the pool of available temporary IMSIs (block 460), so that another SIM can be encoded with the same temporary IMSI, and the process can be repeated at a later time with another wireless device. Hence, the number of IMSIs that need to be maintained in the pool of temporary IMSIs can be minimized as well.

Figure 5:
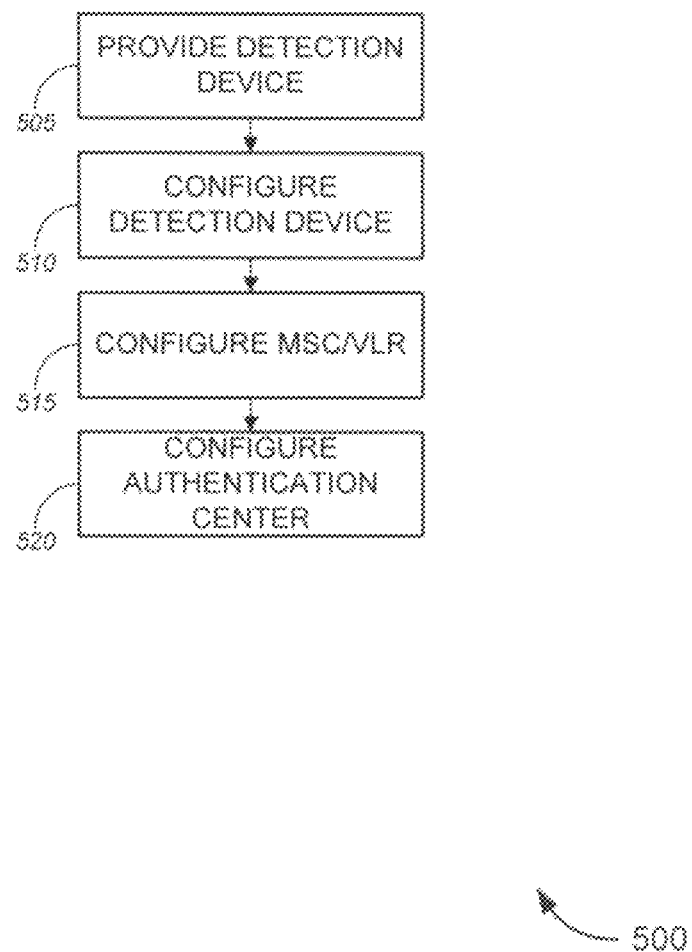
FIG. 5 is a process flow diagram illustrating a method of configuring a wireless network to support wireless device activation, in accordance with various embodiments of the invention.

FIG. 5 is a process flow diagram illustrating a method 500 of configuring a wireless network to support wireless device activation, in accordance with various embodiments of the invention. The method 500 can be implemented within the business method 400 described above and/or as a precursor to (and/or part of) the activation process described below with respect to FIG. 6.

The method 500 comprises providing a detection device (block 505). Providing a detection device might comprise installing the detection device in a wireless provider's network. The features of a detection device are described in general above, and specific functionality of one embodiment of a detection device is described in further detail below with respect to FIG. 6. Providing a detection device might also comprise configuring the detection device (block 510). Configuration of the detection device can include establishing communication between the detection device and other components in the wireless network, establishing communication between the detection device and the activation system, and/or the like. In an aspect, configuring the detection device can also comprise storing in the detection device a pool of temporary MSISDNs that can be used for the activation process, and/or installing, on the detection device, code (e.g., hardware, firmware and/or software instructions) that implements the functionality described herein.

The method 500 may also comprise configuring specific components of the wireless network to operate in accordance with embodiments of the invention. Specifically, in sonic cases, an MSC and/or VLR (and/or any other necessary component within the wireless network) is configured to treat the detection device as the HLR for any IMSI that falls within the pool maintained by the activation system (block 515). Hence, when an unactivated wireless device (which is assigned a temporary IMSI) attempts to register with the network, the network will seek information about that wireless device from the detection device, as opposed to the conventional HLR (which, at that point will be unaware of the wireless device, since the wireless device has not been activated).

Configuration of the network can also include configuration of the authentication center (block 520). Configuration of the authentication center includes, in one aspect, populating the authentication center with security keys for wireless devices identified by the temporary IMSIs (that is, creating records in the authentication center that correlate temporary IMSIs with the shared secrets stored on the SIMs encoded with those temporary IMSIs; these shared secrets then can be used to generate the necessary security keys for the wireless devices, as described above). This process may be similar to the configuration of an authentication center under a traditional activation process, except that the temporary IMSI is used instead of a permanent IMSI).

These configuration operations, in an embodiment, can be performed automatically (and/or based on user input) by the activation system. In another embodiment, this configuration is performed manually.

Figure 6:
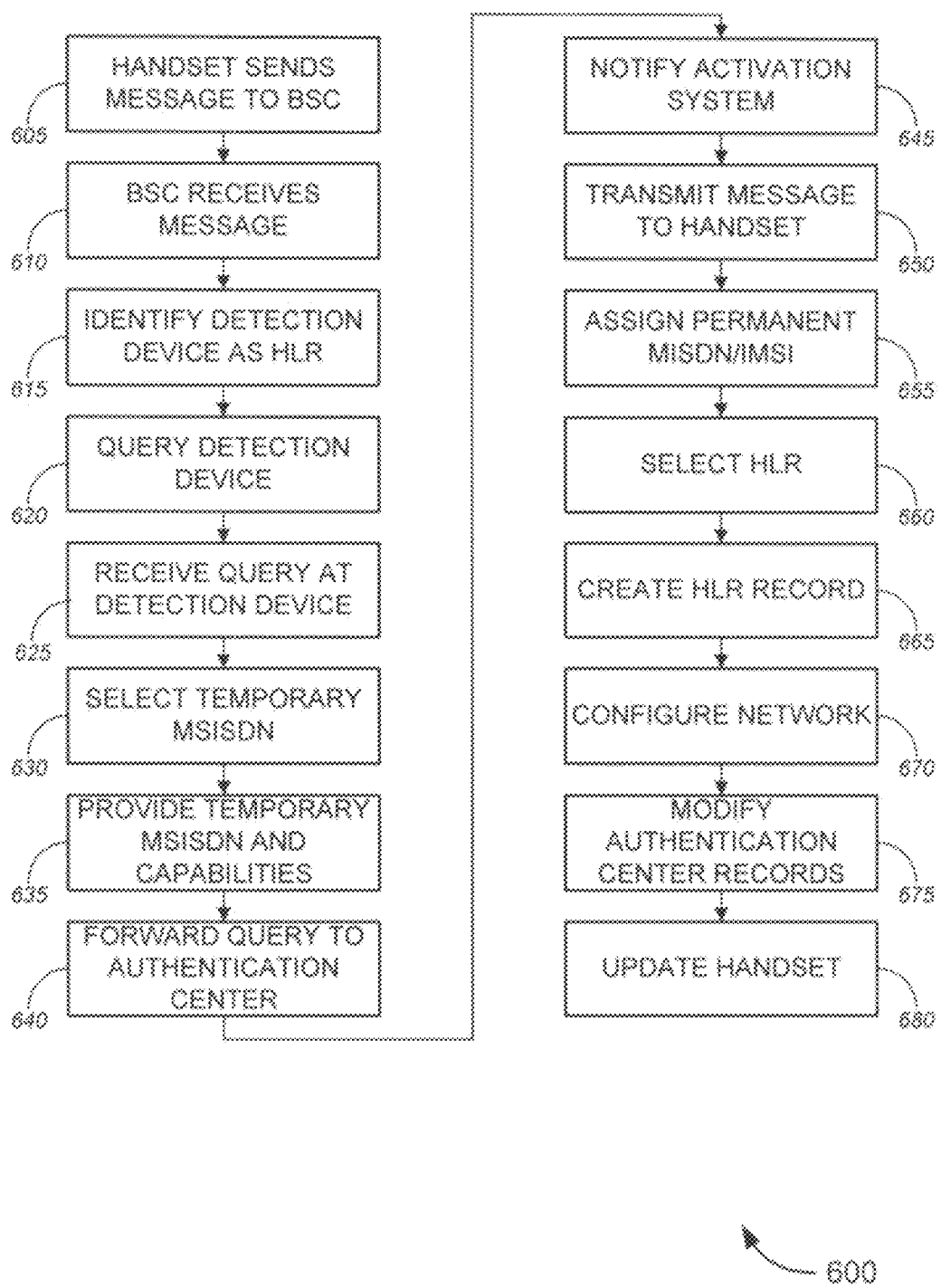
FIG. 6 is a process flow diagram illustrating a method of activating a wireless device on a wireless network, in accordance with various embodiments of the invention.

FIG. 6 is a process flow diagram illustrating a method 600 of activating a wireless device on a wireless network, in accordance with various embodiments of the invention. In one aspect, the method 600 may be performed using a wireless network that has been configured in accordance with the method 500. In another aspect, the method 600 may include the method 500.

In accordance with the method 600, an unactivated wireless device (i.e., a wireless device that has not been activated as a subscriber of the wireless provider and/or has not been activated as a subscriber on the wireless network) attempts to send a message (such as registration message, upon power up or upon entering the service area of the network) to the network (block 605). In an aspect, the message is sent to a base station controller (e.g., transmitted by the wireless device, received at a base station, and relayed to the base station controller) in somewhat conventional fashion. Upon receiving the Message at the base station controller (block 610), the network (and/or, more specifically, in some case, an MSC and/or VLR) identifies IMSI of the wireless device from the message, in conventional fashion. Based on this identification of the IMSI, the network (and/or the MSC/VLR) identifies the detection device as a quasi-HLR for the wireless device (block 615). In other words, the network identifies the detection device as the HLR for the wireless device (the term "quasi-HLR" is used to indicate that, although the detection devices is recognized as an HLR by the network, it does not function as a conventional HLR, but instead functions in accordance with the invention). Notwithstanding the differences between the detection device and an HLR, the network can identify the detection device as an HLR in a manner similar to the conventional identification of a HLR for a wireless device, except that the network has been modified (e.g., by a configuration operation as described above) to identify the detection device, as opposed to a traditional HLR.

The network and/or one or more of its components (e.g., the MSC and/or VLR) then effectively treats the detection device as the HLR for the wireless device, querying the detection device for data pertaining to the wireless device (block 620), such as the MSISDN of the wireless device and/or the capabilities of the wireless device. The detection device, upon receiving the query (block 625), selects a temporary MSISDN for the wireless device (block 630), perhaps from a pool of temporary MSISDNS maintained by the detection device and/or based on receiving an MSISDN from the activation system, and provides this temporary MSISDN and a description of the capabilities of the wireless device to the component (e.g., MSC and/or VLR) that queried the detection device (block 635).

In particular, the detection device might provide a notification to the component that the wireless device is capable of sending and/or receiving certain types of messages (such as short messaging service ("SMS") messages, Unstructured Supplementary Service Data ("USSD") messages, etc.), but is not capable of placing or receiving voice calls or providing any other services. In this way, the wireless device can be given sufficient functionality to complete the activation process, but remain otherwise limited until the activation process has been completed.

The detection device then queries the authentication (or forwards the query from the querying component) to the authentication center (block 640), so that the authentication center can provide the security key for the wireless device (which may be generated as noted above). In an aspect, this procedure can be undertaken in similar fashion to the operation of an HLR when receiving such a query.

The detection device also notifies the activation system, using any suitable method of communication (which can vary, depending on the implementation of the invention, but might be SS7-formatted messages, IP messages, and/or the like) that the wireless device has been detected on the wireless network (block 645), so that the activation system can perform the procedures necessary to activate the wireless device for use on the network.

In some embodiments, the activation system transmits a message (e.g., an SMS message. USSD message, etc.) to the wireless device (block 650) as part of the activation process. The nature of the message can vary, depending on the options provided to the user for selecting an MSISDN. In some cases, the message might simply inform the user of the MSISDN assigned to the wireless device as part of the activation process. In other cases, the message might invite the user to begin an MSISDN selection process, one example of which is described below with respect to FIG. 7. Based either on such a selection process, or on assignment of a default MSISDN (which might be the next available MSISDN, etc.), the activation system assigns a permanent MSISDN to the wireless device (block 655).

In addition, in sonic embodiments, the activation system assigns a permanent IMSI to the wireless device (or, more specifically to the wireless device's SIM). By assigning a permanent IMSI to the wireless device, these embodiments can avoid having to reconfigure the network to treat the temporary IMSI as a permanent IMSI, and can allow for reuse, at a later time, of the temporary IMSI. (It is possible, however, that some embodiments might reconfigure the network to treat the temporary IMSI as a permanent IMSI, for example by defining a real HLR—instead of the detection device—as the HLR for the wireless device, rather than assigning a different permanent IMSI to the wireless device.

To effectuate the assignment of the permanent MSISDN and/or IMSI to the wireless device, an HLR for the wireless device generally will be updated with the relevant information. In some cases, the activation system (or another component) selects a HLR to be the HLR for the wireless device (based on the location of the base station and/or controller with which the wireless device is in communication, based on the region of the MSISDN selected by the user, based on the user's preferred home location, etc.) (block 660). In other cases, there may be a default HLR that needs to be updated.

The HLR, then, is configured and/or updated by creating, in the HLR, a record that comprises the permanent IMSI and MSISDN (block 665). This process may be performed in the manner in which such records are typically created, or a specialized process, perhaps implemented by the activation system. Techniques for adding/updating HLR records are known in the art, and any of such techniques may be used as appropriate.

In some cases, the HLR is configured after a permanent MSISDN and/or IMSI has been assigned to the wireless device (or, more properly, to the SIM card). In other cases, a limited pre-provisioning technique may be employed, in which the HLR is configured (e.g., using a batch process on an appropriate periodic basis, perhaps based on an estimate of the number of activations that will occur over the period) with a number of pre-provisioned, paired MSISDN/IMSI combinations that have not yet been assigned to a wireless device, and/or other components of the wireless network can be configured to recognize the association of the pre-provisioned IMSIs with the HLR. In particular embodiments, the HLR may be configured this way prior to initiation of the activation process of a wireless device (e.g., before the wireless device ever even attempts to register with the network and, correspondingly, before the detection device is ever queried by the network). When the wireless device is activated in such a scenario, the pool of MSISDNs from which the permanent MSISDN can be selected (using any of the techniques described elsewhere herein, for example) may be limited to the pre-provisioned MSISDNs, and the permanent IMSI will then be the IMSI that has been paired with the MSISDN during the pre-provisioning process.

Even though the pre-provisioning requires the consumption of some IMSI numbers and MSISDNs prior to their utilization in the network, the number of IMSI/MSISDN pairs that are pre-provisioned at any given time might still fall far short (by orders of magnitude, in some cases) of the number SIMs in the supply chain, such that a major proportion of the advantages provided by various embodiments may be realized, while reducing the time and network resources consumed by the activation process.

In such embodiments, the wireless device, upon activation, may be configured (as described below, for example) with the pre-provisioned IMSI that is paired in the HLR with the pre-provisioned MSISDN that has been selected for the SIM/wireless device. In such embodiments, the activation process may be streamlined, by nature of the fact that the HLR(s) likely will not need to be updated as part of the activation process, and because other network components may not need to be configured at activation to recognize an HLR as the HLR for the permanent IMSI (as described below for example), since the pre-provisioning of the IMSI/MSISDN pairs will have provided for this step already; in general, fewer network components will require updating using this technique, so the time required for activation (and the impact of multiple simultaneous activations on the network) can be reduced. Of course, it should be appreciated that, even under this scenario, some network configuration (such as configuration of the authentication center, as described below) may still need to be performed at the time of activation.

In some cases, embodiments may employ schemes that use both limited pre-provisioning techniques and the configuration of the HLR during activation, depending on the circumstances of activation. Merely by way of example, the limited pre-provisioning technique may be used as a default, with a fail-over to configuration of the HLR during activation if the system exhausts the supply of pre-provisioned MSISDN/IMSI pairs. As another example, the limited pre-provisioning technique may be used, except when the user elects to use an enhanced number selection option (as described below, for example), in which case, the HLR might be configured upon activation, to provide the user with a broader set of MSISDNs from which to select. (In a particular aspect, for example, the user might be charged a first fee, or nothing at all, to select an MSISDN that has been preprovisioned, or to accept assignment by the system of a pre-provisioned MSISDN. On the other hand, the user may be charged a different, perhaps higher, fee for the privilege of selecting an MSISDN that has not been pre-provisioned.)

This limited pre-provisioning process can also be used to enable the efficiency gains provided by various embodiments to be realized in a postpaid environment. It will be appreciated that, in most postpaid scenarios, the user typically will be required to sign an agreement to pay for wireless service with a particular provider (or to provide other accounting information to allow the provider to bill the user for service), and upon signing the agreement or providing this information, the user is provided with a wireless device (or provides a wireless device), which is then allocated an MSISDN by the provider. (This typically happens at a wireless provider's retail location.) To facilitate this type of scenario while maintaining the efficiencies of various embodiments, the tools might employ a technique in which the provider notifies the activation system of the MSISDN allocated by the provider to the wireless device (or, more precisely in some cases, to the SIM card in the wireless device). Upon receiving this notification, the system can pre-provision this MSISDN (with a paired IMSI) on an HLR. Accordingly, the wireless device then may be activated (as described herein) with the IMSI that had been paired with the assigned MSISDN during the pre-provisioning.

If necessary, the wireless network may then be configured to recognize the selected HLR as the HLR for the wireless device (e.g., the permanent IMSI) (block 670), perhaps in a manner similar to that used in a traditional activation of a new wireless device. (As noted above, if IMSI/MSISDN pairs are pre-provisioned prior to activation, this configuration may be unnecessary at the time of activation.) In addition, as necessary, the authentication center is configured by modifying the records of the authentication center to associate the shared secret on the SIM with the permanent IMSI (block 675). In an aspect, this modification might comprise simply modifying the appropriate record to reference the permanent IMSI, while in another aspect, the record for the temporary IMSI, might be deleted, and a new record created; the new record would comprise the permanent IMSI and the existing shared secret stored on the SIM.

The method 600 may also comprise updating the wireless device to reflect the permanent MSISDN and/or IMSI (block 680). In an aspect, this update is performed via an over-the-air update of the SIM via the wireless network. As used herein, the term "over-the-air update" is used broadly to refer both to a somewhat typical "OTA" provisioning technique that is known to those skilled in the art, as well as to any technique that provides information to the wireless device (perhaps in the form of a standard message) to allow and/or force the wireless device to update the IMSI on the SIM. Merely by way of example, in some embodiments, the wireless device is configured with a SIM toolkit that provides applications for updating information on the SIM. The over-the-air-update, then, might comprise transmission of a message (such as a SMS message, USSD message, and/or the like), which is received at the wireless device. Upon receipt, the message is processed by the SIM toolkit, which uses the information in the message (e.g., the permanent IMSI and/or MSISDN) to update the SIM/wireless device accordingly.

It should be noted that updating the wireless device typically will include updating the SIM to associate the SIM with the permanent IMSI, but that the permanent MSISDN may not need to be used to configure the wireless device to operate on the network (since the MSISDN is paired in the HLR, as noted above, with the IMSI, and the wireless device need only provide the IMSI to register with the network during normal operation). Nonetheless, the wireless device may be updated with the permanent MSISDN for the convenience of the user, for example, by updating the wireless device's phonebook to indicate that the permanent MSISDN is the "phone number" for that wireless device, by assigning a voicemail button to access voicemail for hat MSISDN, etc.

At this point, the wireless device has been activated and can be used on the network, in conventional fashion, and, if appropriate, the temporary IMSI and/or temporary MSISDN can be returned to their respective pools in due course, so that they can be reused.

Figure 7:
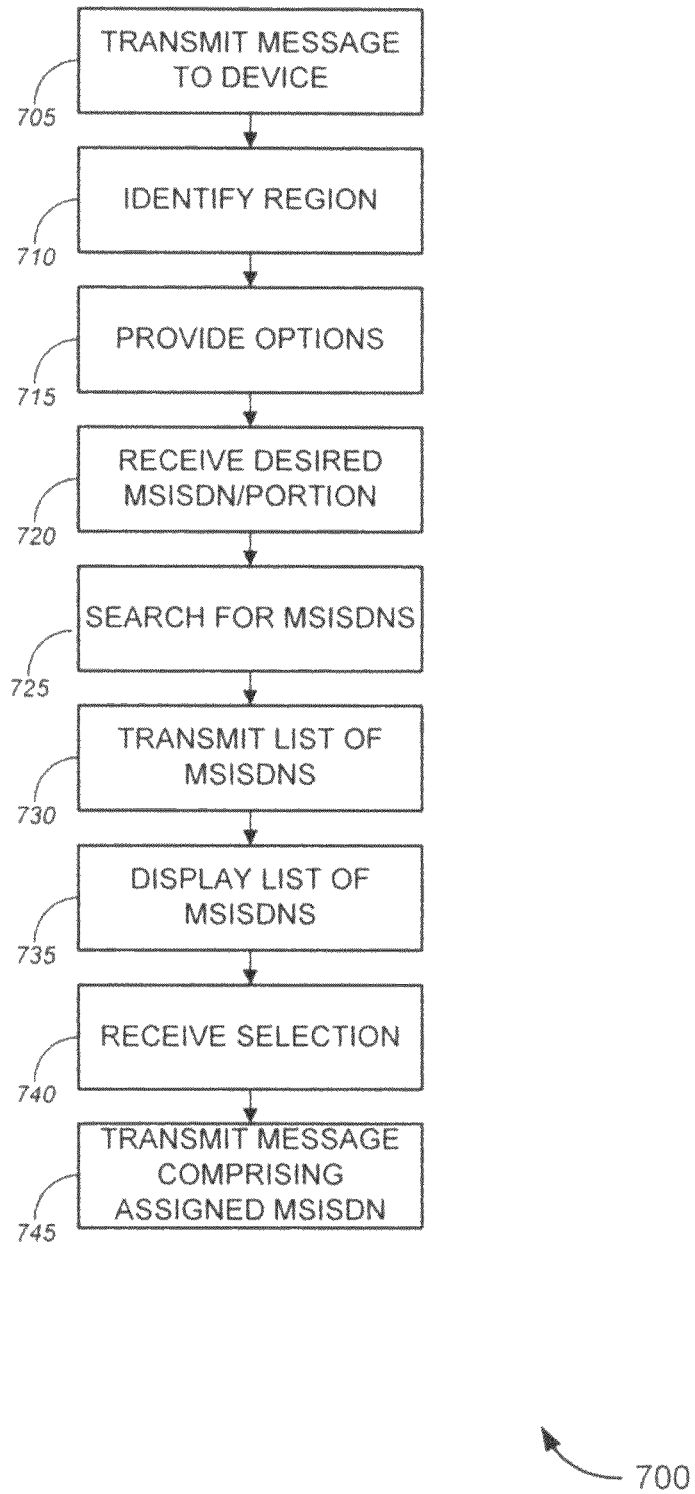
FIG. 7 is a process flow diagram illustrating a method of assigning, and/or allowing a user to select, a permanent addressing number for a wireless device, in accordance with various embodiments of the invention.

FIG. 7 is a process flow diagram illustrating a method 700 of assigning a permanent MSISDN to a wireless device and/or allowing a user to select a permanent MSISDN, in accordance with various embodiments of the invention. In one aspect, the method 700 can be incorporated into the method 600 described above, and in particular embodiments, into the MSISDN assignment procedures of that method.

The method 700 comprises sending a message (block 705), such as an SMS message and/or USSD message, for example, to the wireless device inviting the user to begin the MSISDN (number) selection process (see block 650, above). In some cases, the number selection process may be implemented by a series of SMS, USSD, etc. messages between the wireless device and the activation system (e.g., via the wireless network). Additionally and/or alternatively, the number selection process may be implemented as an application and/or applet (e.g., a Java applet) that is downloaded to the phone. Other techniques are possible as well.

In one aspect, the message provides the user with two or more options for selecting an MSISDN (block 710); these options can include, without limitation, accepting an assigned MSISDN, selecting an MSISDN from a specified list of available numbers, specifying a desired MSISDN (and/or portion—i.e., character string—thereof), selecting from among a list of "golden" (or premium) MSISDNs that are considered highly desirable, and/or the like. In an aspect, the message might also notify the user of respective charges (each of which might be a one-time charge or repeating charges) associated with each of the options. The charges, as indicated above, can vary according to which option is selected.

Depending, in some cases, on the option selected by the user and/or by the characteristics of the telephone system at the user's locale, it may be necessary to identify a home region for the wireless device (block 710), as the user's choice of region may affect the available MSISDNs. For example, in the United States, the user may desire a particular area code, which dictates the first three digits of the MSISDN to be used. Identification of a region can be based on a selection of region/regional code by the user, based on the user's current location (as indicated by GPS coordinates, by the location of the base station/controller in communication with the wireless device, etc.), based on the user's expressed home location, and/or the like.

Depending on the option specified by the user, the number selection process may vary. For example, if the user has elected to specify a desired portion of an MSISDN, the user is prompted to input the desired character string, and the string is transmitted from the wireless device and received by the activation system (block 720). The character string might be alphabetic and/or numeric—if some or all of the string is alphabetic, it can be translated by the activation system and/or an applet on the wireless device to a numeric string, based on the correlation of alphabetic and numeric characters on a common telephone keypad.

At block 725, the activation system searches an inventory of available MSISDNs for appropriate numbers. If the user has selected the option of specifying a desired portion of the MSISDN, the search is constrained to numbers matching the desired string, if available. Likewise, the search may be constrained to numbers having the correct regional code for the identified region (if specified). A list of one or more MSISDNs is prepared and transmitted to the wireless device (block 730). If the user simply elected to select from a list of available MSISDNs, the list might comprise the next group of available MSISDNs (subject to regional constraints), while if the user opted to specify a desired portion, the list might comprise available numbers that contain the desired string. If the user elected to select a premium number, the list might comprise one or more MSISDNs with desirable characteristics (e.g., easy to memorize, etc.). The wireless device, upon receiving the list, displays the list for the user (block 735) and provides an interface for the user to select an MSISDN from the list (again, perhaps via keypad input). Upon receiving the selected MSISDN (block 740), the activation system assigns the selected MSISDN to the wireless device (as detailed above).

Optionally, a message may be transmitted to the wireless device (block 745); the message, in an aspect, comprises the assigned MSISDN. If the user had elected to accept a default MSISDN, this message may simply inform the user of the assignment. If the user elected one of the other options, the message can serve to confirm the user's earlier selection of the MSISDN.

Figure 8:
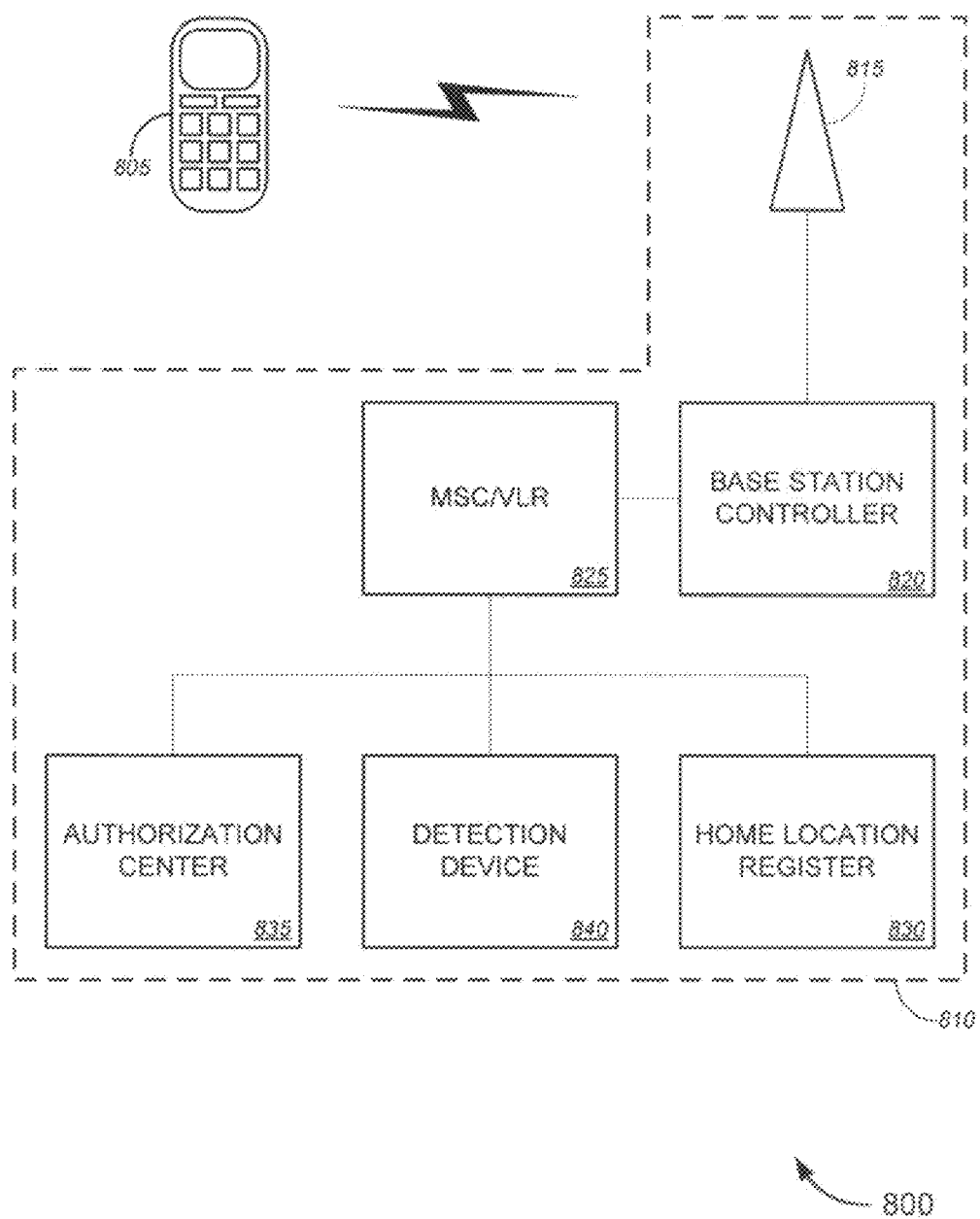
FIG. 8 is a process flow diagram illustrating a business process based on device activation, in accordance with various embodiments of the invention.

FIG. 8 illustrates another arrangement 800 between a wireless device 805 and a wireless network 810, in accordance with embodiments of the invention. The arrangement 800 is similar to the arrangements 100 and 200 described above, and it operates in similar fashion, except that the arrangement 800, is configured to provide occasional network access to the wireless device 805 without requiring the wireless device to be provisioned with a permanent addressing number. In accordance with a set of embodiments, in addition to the base station 815, base station controller 820, MSC/VLR 825, HLR 830 and authentication center 835, the arrangement includes a detection device 840. The detection device 840 can be any device and/or computer system that can be configured to perform the function ascribed herein to the detection device 840. (The detection device 840 is also referred to herein as a "first use register" or "FUR".) In some cases, the detection device 840 may be implemented by a modified HLR; in other cases, the detection device 840 may be purpose-built from scratch. In the illustrated embodiment, the detection device 840 resides within the network 810 (in various other arrangements, the detection device 840 may be either inside or outside the network 810 and/or may be in communication, either through the network 810 or otherwise, with various components of the network.)

One mode of operation of the arrangement 800, and in particular the detection device 840 is described in detail below. In a general sense, however, a set of embodiments provides a detection device that is configured to act as a "quasi-HLR." In other words, the detection device (which is not a HLR 830 and generally does not perform the functions of an HLR 830), is configured to be seen by the network 810—and, in particular the MSC 825—as the HLR for an unactivated wireless device 805. Hence, when the wireless device 805 attempts to register with the network 810, the MSC 825 queries the detection device 840, rather than the HLR 830, for data about the wireless device 805. The detection device 840, in turn, is responsible for assigning a temporary addressing number and/or appropriate profile to the wireless device 805 to allow the wireless device temporary access to the network 810.

Figure 9:
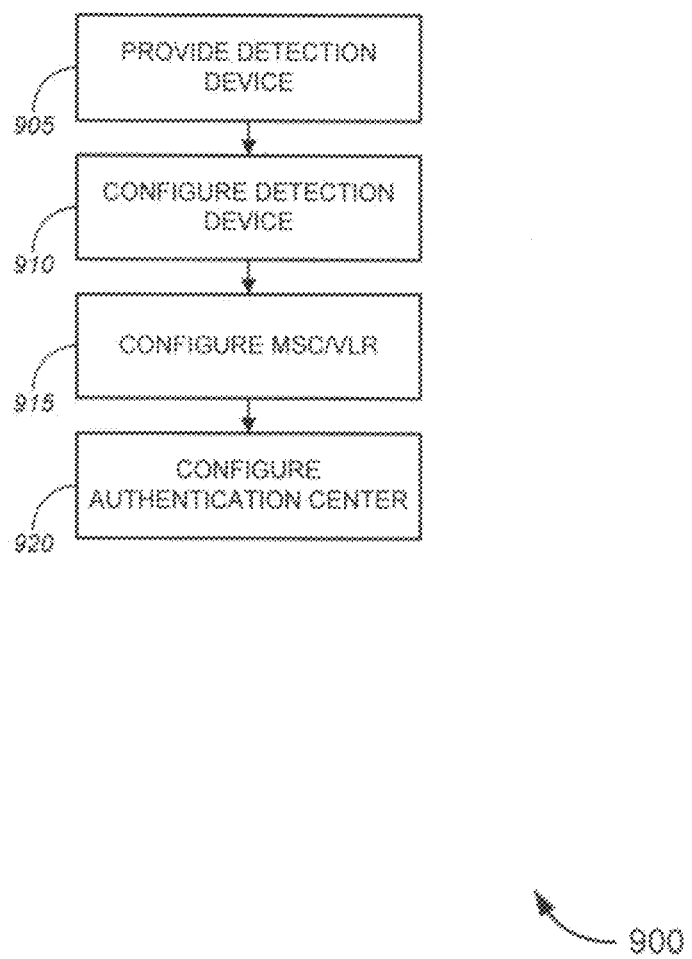
FIG. 9 is a process flow diagram illustrating a method of configuring a wireless network to support occasional access by a wireless device, in accordance with various embodiments of the invention.

FIG. 9 is a process flow diagram illustrating a method 900 of configuring a wireless network to support occasional access by a wireless device, in accordance with various embodiments of the invention. The method illustrated in FIG. 9 is similar to the method illustrated in FIG. 5 described above, except that the method is configured to provide occasional network access to wireless devices without provisioning a permanent addressing number. The method 900 comprises providing a detection device (block 905). Providing a detection device might comprise installing the detection device in a wireless provider's network. The features of a detection device are described in general-above, and specific functionality of one embodiment of a detection device is described in further detail below with respect to FIG. 10. Providing a detection device might also comprise configuring the detection device (block 910). Configuration of the detection device can include establishing communication between the detection device and other components in the wireless network, establishing communication between the detection device and the activation system, and/or the like. In an aspect, configuring the detection device can also comprise storing in the detection device a pool of temporary MSISDNs that can be assigned, on a per-use basis, to wireless devices accessing the network, and/or installing, on the detection device, code (e.g., hardware, firmware and/or software instructions) that implements the functionality described herein.

The method 900 may also comprise configuring specific components of the wireless network to operate in accordance with embodiments of the invention. Specifically, in some cases, an MSC and/or VLR (and/or any other necessary component within the wireless network) is configured to treat the detection device as the HLR for any IMSI that falls within the range of IMSIs reserved for occasional-access wireless devices (block 915). Hence, when such as device (which is assigned an IMSI within this range) attempts to register with the network, the network will seek information about that wireless device from the detection device, as opposed to the conventional HLR (which, at that point will be unaware of the wireless device, since the wireless device has not been activated on the network).

Configuration of the network can also include configuration of the authentication center (block 920). Configuration of the authentication center includes, in one aspect, populating the authentication center with security keys for wireless devices identified by the special IMSIs (that is, creating records in the authentication center that correlate the special IMSIs with the shared secrets stored on the SIMs encoded with those special IMSIs; these shared secrets then can be used to generate the necessary security keys for the wireless devices, as described above). This process may be similar to the configuration of an authentication center under a traditional activation process for a full-use wireless device.

These configuration operations, in an embodiment, can be performed automatically (and/or based on user input). In another embodiment, this configuration is performed manually.

Figure 10:
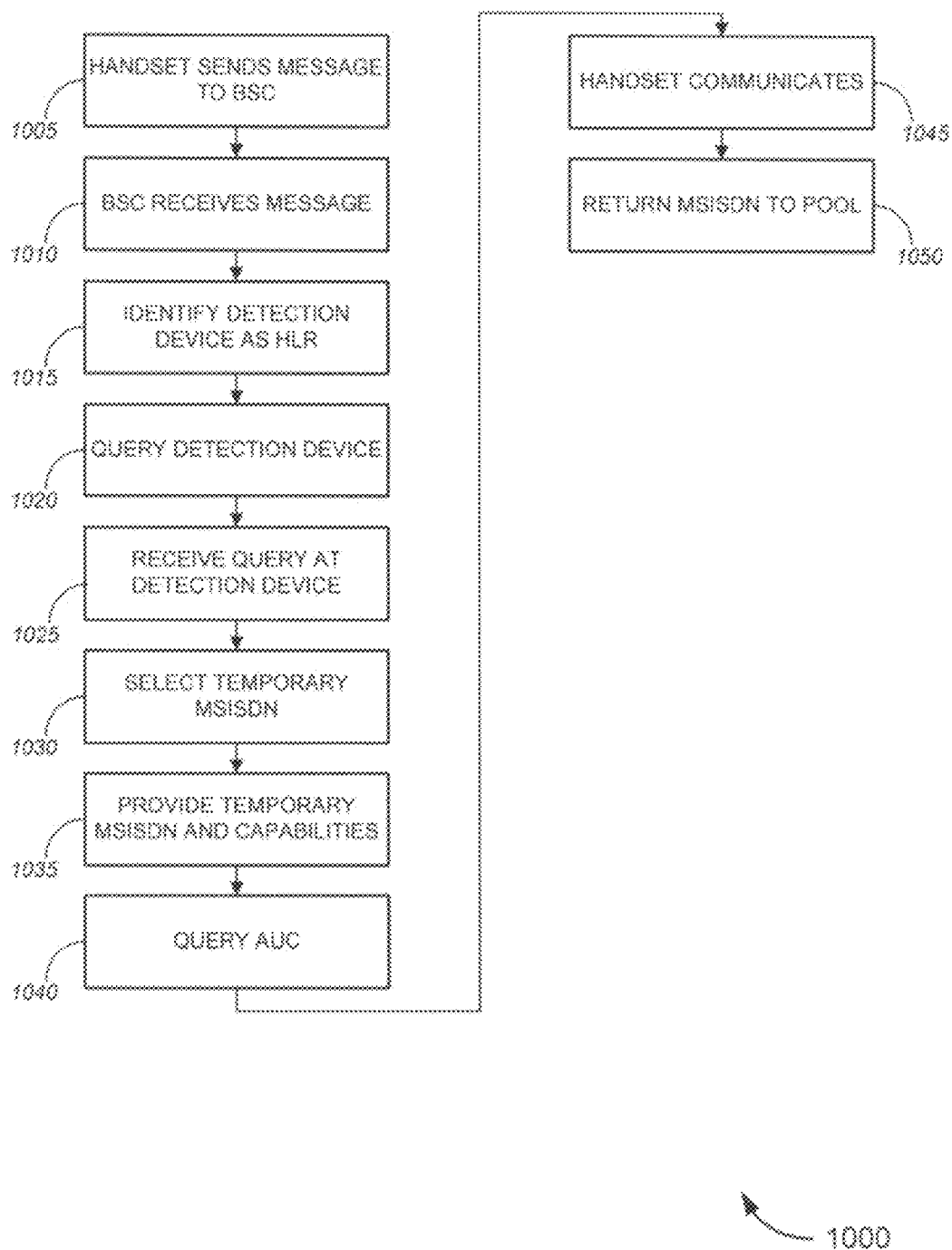
FIG. 10 is a process flow diagram illustrating a method of allowing a wireless device occasional and/or temporary access to a wireless network, in accordance with various embodiments of the invention.

FIG. 10 is a process flow diagram illustrating a method 1000 of providing a wireless device with temporary and/or occasional access to a wireless network, in accordance with various embodiments of the invention. In one aspect, the method 1000 may be performed using a wireless network that has been configured in accordance with the method 900. In another aspect, the method 1000 may include the method 900.

In accordance with the method 1000, a wireless device (wireless device) that needs to access the network on an occasional and/or temporary basis (and therefore is not assigned a permanent addressing number) attempts to send a message (such as registration message, upon power up or based on a trigger at the device) to the network (block 1005). In an aspect, the message is sent to a base station controller (e.g., transmitted by the wireless device, received at a base station, and relayed to the base station controller (BSC)) in somewhat conventional fashion. Upon receiving the message at the base station controller (block 1010), the network (and/or, more specifically, in some case, an MSC and/or VLR) identifies the IMSI of the wireless device from the message, in conventional fashion. Based on this identification of the IMSI, the network (and/or the MSC/VLR) identifies the detection device as a quasi-HLR for the wireless device (block 1015). In other words, the network identifies the detection device as the HLR for the wireless device (the term "quasi-HLR" is used to indicate that, although the detection devices is recognized as an HLR by the network, it does not function as a conventional HLR, but instead functions in accordance with the invention). Notwithstanding the differences between the detection device and an HLR, the network can identify the detection device as an HLR in a manner similar to the conventional identification of a HLR for a wireless device, except that the network has been modified (e.g., by a configuration operation as described above) to identify the detection device, as opposed to a traditional HLR.

The network and/or one or more of its components (e.g., the MSC and/or VLR) then effectively treats the detection device as the HLR for the wireless device, querying the detection device for data pertaining to the wireless device (block 1020), such as the MSISDN of the wireless device and/or the capabilities of the wireless device. The detection device, upon receiving the query (block 1025), selects a temporary MSISDN for the wireless device (block 1030), perhaps from a pool of temporary MSISDNS maintained by the detection device, and provides this temporary MSISDN and a description of the capabilities of the wireless device to the component (e.g., MSC and/or VLR) that queried the detection device (block 1035).

In particular, the detection device might provide a notification to the component that the wireless device is capable of sending and/or receiving certain types of messages (such as short messaging service ("SMS") messages, Unstructured Supplementary Service Data ("USSD") messages, etc.), but is not capable of placing or receiving voice calls or providing any other services. In this way, the wireless device can be given sufficient functionality to send or receive the necessary data to fulfill its function, but remain otherwise limited with respect to network capabilities. In another embodiment, the wireless device's functionality may not be limited so that the data transmission may include a wireless data bearer (GPRS, EDGE, EVDO, HSPA, CSD, HSCSD, etc.), a voice call, and/or any other suitable service.

The detection device then queries the authentication center, and/or forwards the query from the querying component to the authentication center (block 1040), so that the authentication center can provide the security key for the wireless device (which may be generated as noted above). In an aspect, this procedure can be undertaken in similar fashion to the operation of an HLR when receiving such a query.

At this point, the wireless device is capable of data exchange with the network and/or with a data collector in communication with the network. Accordingly, the wireless device communicates as necessary (block 1045) to send and/or receive the appropriate data over whatever bearer is supported by the wireless device's profile. When the wireless device is finished communicating, the wireless device unregisters from the network, and the temporary addressing number is returned to the pool (block 1050), so that it can be used to provide temporary access for another wireless device at a later time. This procedure may include purging a VLR of any information that associates the wireless device with the temporary addressing number.

Figure 11:
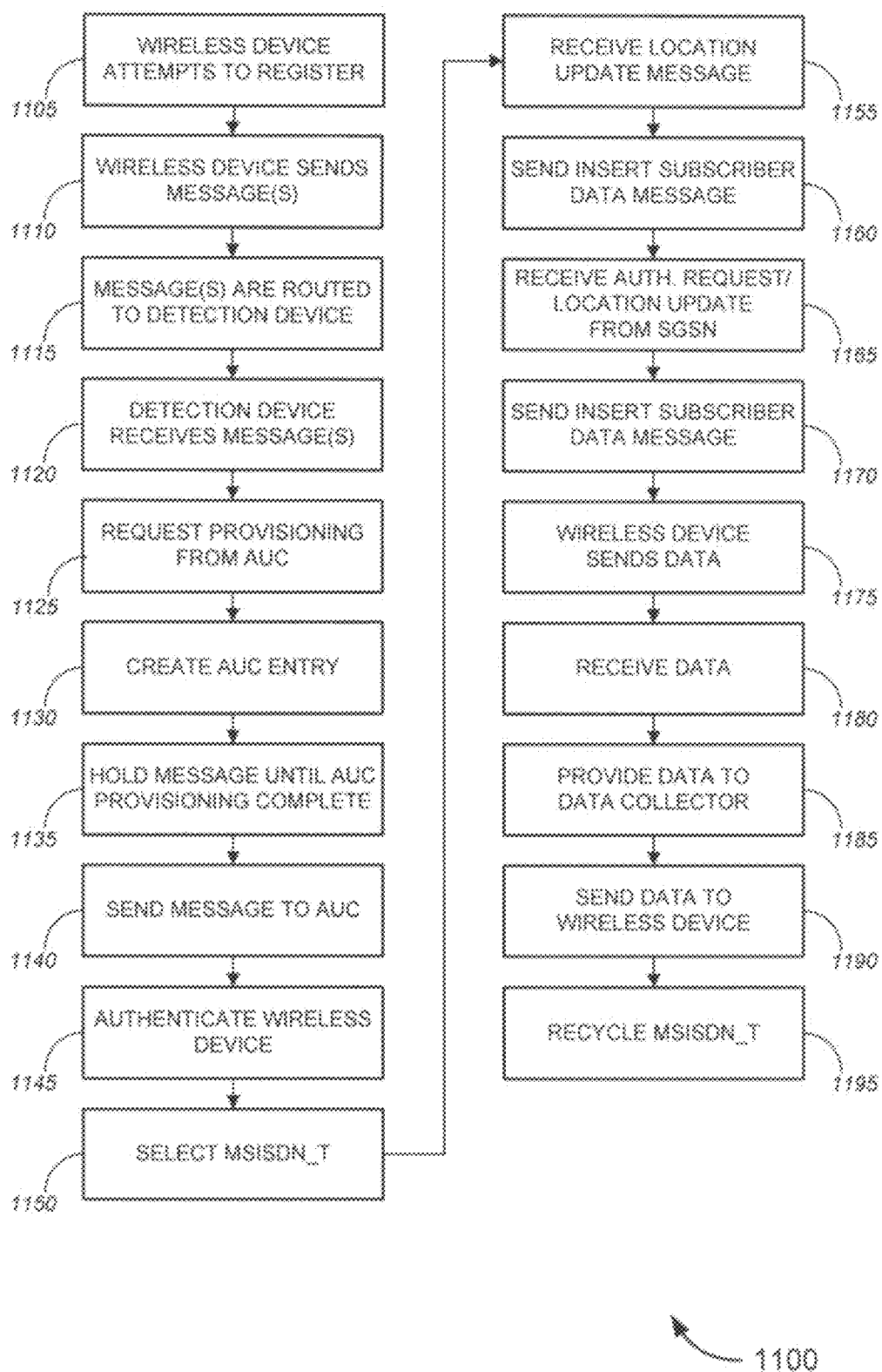
FIG. 11 is a process flow diagram illustrating a method of allowing a wireless device occasional and/or temporary access to a wireless network, in accordance with various embodiments of the invention.

While FIG. 10 illustrates a general process for allowing occasional access to a wireless network, implementation-specific details of different embodiments may vary. FIG. 11 illustrates a method of providing occasional and/or temporary access to a wireless device according to one such implementation. When the SIM card is inserted into the wireless device (and/or a wireless device with such a SIM is powered on), the card (or the wireless device) attempts to register on the network using a special IMSI value (occasionally referred to herein as IMSI_S) created in the card when it was manufactured (block 1105). This special IMSI value, as described above, is part of a range (or pool) of IMSIs that are known to the network as being associated with a detection device. (In certain embodiments that allow for occasional access, this initial IMSI_S value is not overwritten by the detection device; instead, this initial IMSI_S value may be retained by the SIM as the permanent IMSI described above, such that the wireless device is attached to a detection device, rather than a normal HLR, every time the wireless device registers on the network). In an aspect, when attempting to register with the network, the wireless devices sends one or more messages (identified by the IMSI_S value), such as a "Send Authentication Information" message to the network (block 1110).

These messages are received at the network (e.g., at a base station controller), and rather than routing the messages to an HLR, as would be typical, the routing within the SS7 network for the IMSI_S ranges(s) delivers the messages involved in this interaction to the detection device instead of the HLR, based on identifying the IMSI_S as being part of the pool of IMSIs known to be associated with the detection device (block 1115). (As noted above, the routing for the IMSI_S range(s) within the SS7 network may be setup so that this is delivered to the detection device.) Accordingly, the detection device receives the "Send Authentication Information" message (block 1120).

This message optionally triggers a provisioning request to the authentication center (block 1125). Optionally, the authentication center might create an authentication center entry for the IMSI_S value using the encrypted Ki values associated with that IMSI_S (block 1130). (The encrypted Ki values are specified by the SIM card manufacturer and are typically recorded in a SIM order response file. The values would be loaded into the detection device using some administrative interface and/or API.) The detection device holds the "Send Authentication Information" message until the provisioning is complete (block 1135). Alternatively, the authentication center may be pre-provisioned for the IMSI_S of the wireless device.

If necessary, the detection device forwards the "Send Authentication Information" message to the authentication center (either after authentication center provisioning is complete or immediately if the authentication center has been pre-provisioned) (block 1140). The authentication center authenticates the SIM card by comparing the Ki values on the card against those specified by the SIM card manufacturer (and stored in the authentication center) (block 1145).

At this point, the wireless device (or, more specifically in some cases, the SIM card in the wireless device) has been authenticated, so the network can provide the wireless device with an temporary MSISDN, to allow the wireless device to communicate with the wireless network, a data collector, another wireless device such as in machine to machine (or machine to equipment, etc.) communication described above, etc. Accordingly, the detection device selects an available temporary MSISDN (occasionally referred to herein as an "MSISDN_T") out of its pool of available numbers (block 1150).

In accordance with some embodiments, the detection device receives a "Location Update" message, which is a request from the VLR for the subscriber profile in the HLR (block 1155). This triggers the detection device to send an "Insert Subscriber Data" message with the appropriate profile to the VLR (block 1160). The profile enables or disables bearer services such as voice calls and SMS text messaging, as described above, to provide the wireless device with the necessary capabilities to exchange data with the wireless network (e.g., so that the wireless device can communicate with a data collector, etc.). The profile may be based on the network used such as disabling voice services if an outdated/legacy network (e.g. 2G network, etc.) is used.

In some cases, such as the case in which a mobile data bearer is to be used, a secondary attach event will occur with an authentication request from a service GPRS support node ("SGSN"), followed by a location update (also from the SGSN) (block 1165). This location update will trigger a secondary "Insert Subscriber Data" message to the SGSN with a profile to support one or more Access Point Names ("APN") (block 1170). In an aspect of some embodiments, the profile will have a single APN which will be linked to a system that just supports the messages from the wireless device (this system might be a data collector and/or might provide connectivity with a data collector).

The SIM card is now attached to the network and can send data using any of the permitted bearer services (e.g. send one or more text messages, or send data using a mobile data connection, etc.) (block 1175). Optionally, the detection device may receive the data originating from the wireless device (e.g., if the bearer service used is one of USSD or SMS) (block 1180). If this is the case, the detection device would make the data received available over some API to the appropriate data collector (e.g., a centralized logging and monitoring system) (block 1185)

Optionally, the detection device may send data to the device using the same or a different bearer service if the detection device has been administratively configured to do so (block 1190). This could be used, for example, to provide instructions to the wireless device as to the next scheduled date/time the device should provide data; in this way, every time the wireless device connects to transmit its reporting data, the wireless device could receive instructions as to when it should next report data. Additionally, the data sent to the device may include an instruction for a smart meter to start or stop providing a utility, data related to a service and/or operation provided by the wireless device such as current pricing for a utility, etc. as described herein. (Stuart will be providing additional examples).

Additionally, to route SMSs, the detection device may be configured to receive messages and/or map an MSISDN to and/or from an identifier associated with the wireless device. The map may provide a link between an MSISDN previously associated with a wireless device and an MSISDN currently associated with the wireless device to facilitate routing of any SMSs that were not previously received and/or any messages that may have been sent after the MSISDN was recycled. The identifier, for example, may be any identifier associated with the wireless device including the special IMSI, a smart meter number, a weather station identifier, a well site location number and/or address, a car license plate number, etc.

Figure 12:
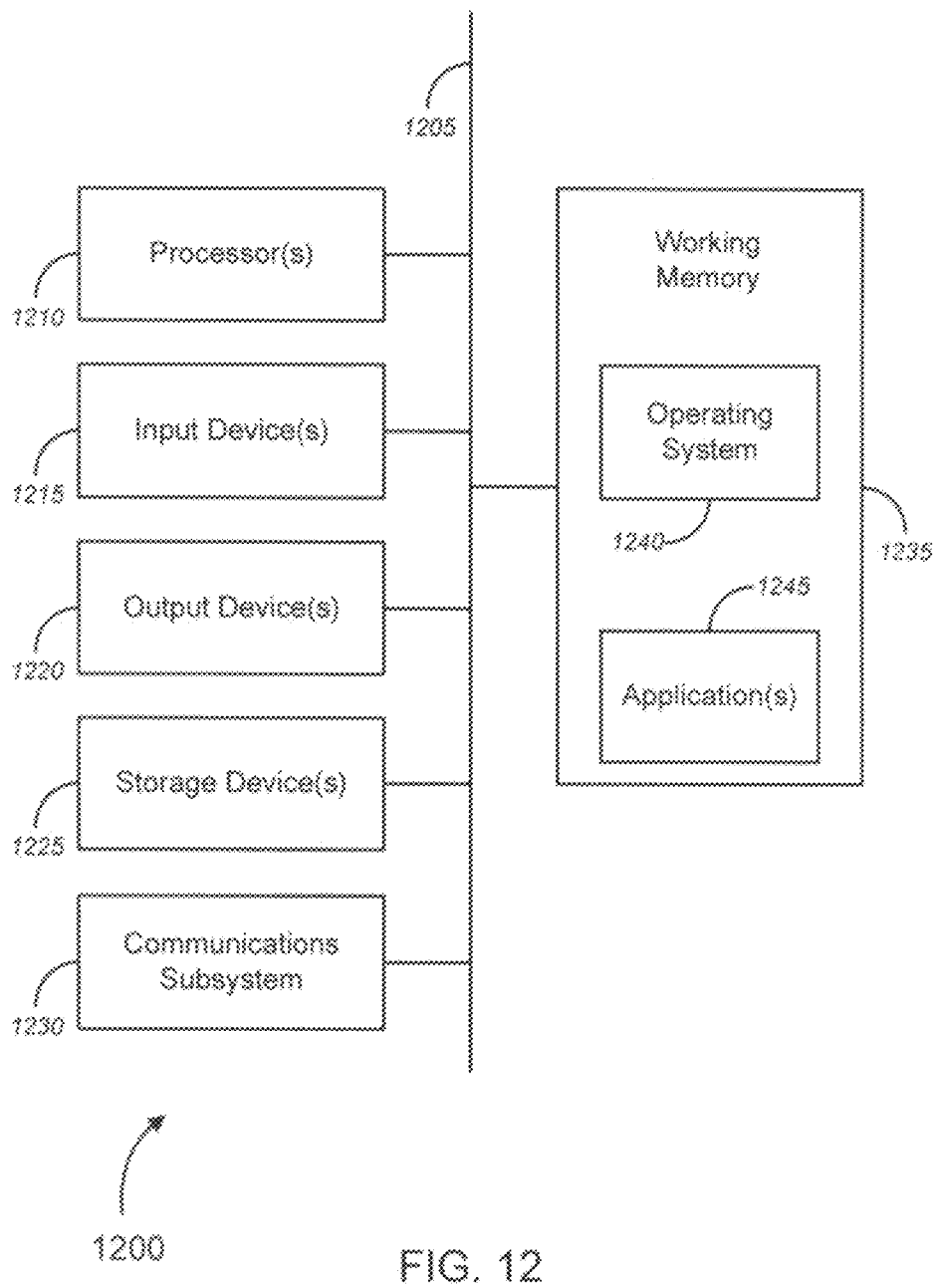
FIG. 12 is a generalized schematic diagram illustrating a computer system, in accordance with various embodiments of the invention.

Optionally, the detection device would recycle the MSISDN_T after a configurable time interval (block 1195). The recycling would make the MSISDN_T available again to the detection device for allocation to a new device (e.g., by returning the MSISDN_T to a pool of such numbers that are available for temporary and/or occasional access by wireless devices) and/or might also cause a "Cancel Location" message to be send to the VLR to purge the profile. Alternatively, the detection device would send the "Cancel Location" message to the VLR when it has finished receiving data FIG. 12 provides a schematic illustration of one embodiment of a computer system 1200 that can perform the methods of the invention, as described herein, and/or can function as a detection device, an activation system, and/or one or more components of a wireless network. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements can include one or more processors 1210, including without limitation one or more general-purpose processors and/or one or more special-purpose processors (such as digital signal processing chips, graphics acceleration chips, and/or the like); one or more input devices 1215, which can include without limitation a mouse, a keyboard and/or the like; and one or more output devices 1220, which can include without limitation a display device, a printer and/or the like.

The computer system 1200 may further include (and/or be in communication with) one or more storage devices 1225, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 1200 might also include a communications subsystem 1230, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240 and/or other code, such as one or more application programs 1245, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 1225 described above. In some cases, the storage medium might be incorporated within a computer system, such as the system 1200. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1200) to perform methods of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another machine-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1200, various machine-readable media might be involved in providing instructions/code to processor(s) 1210 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 1225. Volatile media includes, without limitation dynamic memory, such as the working memory 1235. Transmission media includes coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, arc all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

Figure 13:
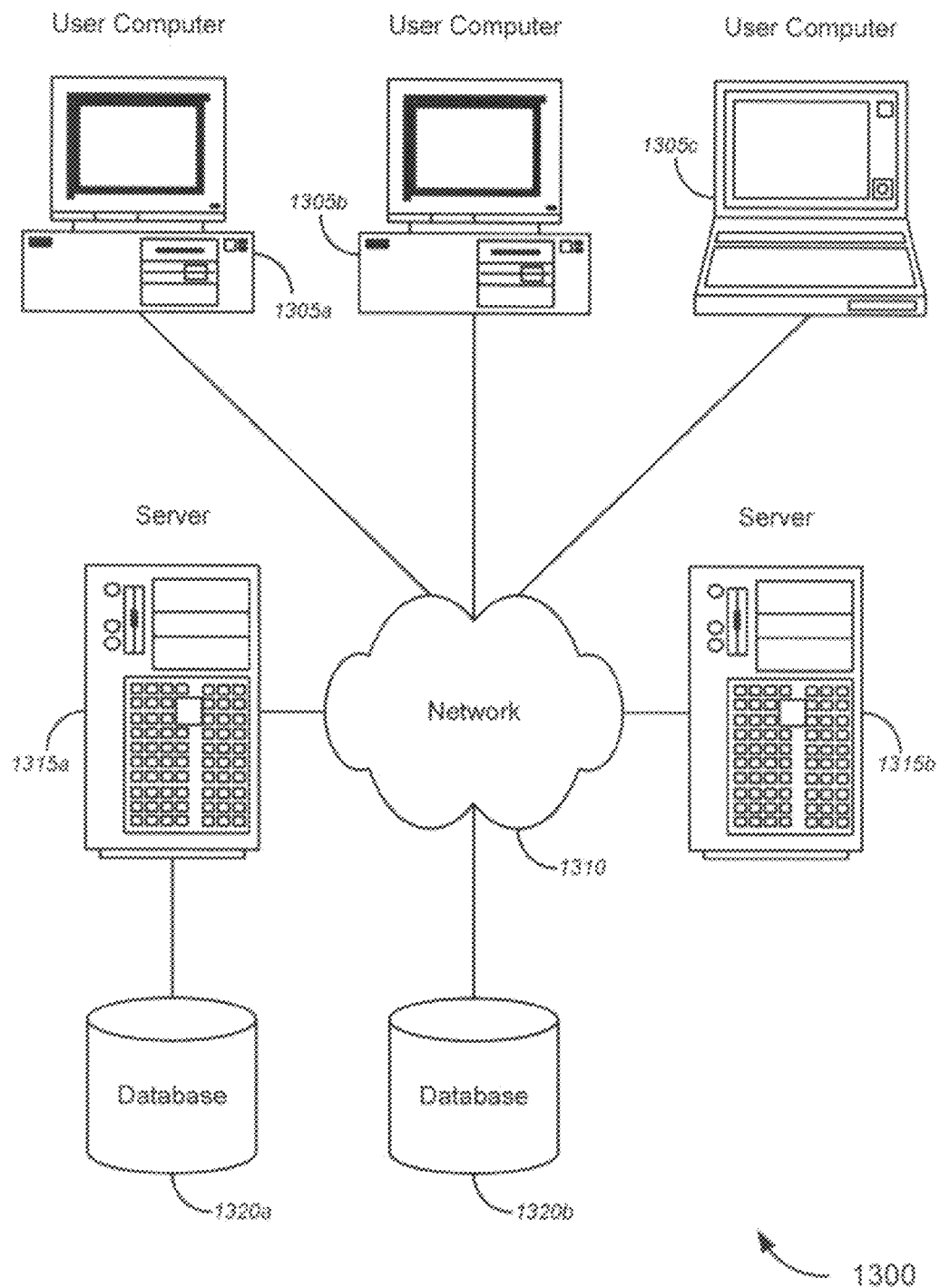
FIG. 13 is a block diagram illustrating a networked system of computers, which can be used in accordance with various embodiments of the invention.

As indicated above, a set of embodiments comprises systems for activating and/or allowing occasional network access to wireless devices. Merely by way of example, FIG. 13 illustrates a schematic diagram of a system 1300 that can be used in accordance with one set of embodiments. The system 1300 can include one or more user computers 1305. The user computers 1305 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1305 can also have any of a variety of applications, including one or more applications configured to perform methods of the invention, as well as one or more office applications, database client and/or server applications, and web browser applications. Alternatively, the user computers 1305 can be any other electronic device, such as a thin-client computer. Internet-enabled mobile telephone, and/or personal digital assistant, capable of communicating via a network (e.g., the network 1310 described below) and/or displaying and navigating web pages or other types of electronic documents. Although the exemplary system 1300 is shown with three user computers 1305, any number of user computers can be supported.

Certain embodiments of the invention operate in a networked environment, which can include a network 1310. The network 1310 can be any type of network familiar to those skilled in the art that can support data communications using any of a variety of commercially-available protocols, including without limitation TCP/IP, SNA, IPX, AppleTalk, and the like. Merely by way of example, the network 1310 can be a local area network ("LAN"), including without limitation an Ethernet network, a Token-Ring network and/or the like; a wide-area network; a virtual network; including without limitation a virtual private network ("VPN"); the Internet; an intranet; an extranet; a wireless network (as described above), a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1315. Each of the server computers 1315 may be configured with an operating system, including without limitation any of those discussed above, as well as any commercially (or freely) available server operating systems. Each of the servers 1315 may also be running one or more applications, which can be configured to provide services to one or more clients 1305 and/or other servers 1315. In an aspect, an activation system may comprise one or more server computers 1315, each of which might implement various portions of the functionality described above.

The server computers 1315, in some embodiments, might include one or more application servers, which can include one or more applications (such as an activation application comprising instructions to perform operations in accordance with the wireless device activation methods described above, business applications, including supply chain management applications, etc.) accessible by a client running on one or more of the client computers 1305 and/or other servers 1315. Merely by way of example, the server(s) 1315 can be one or more general purpose computers capable of executing programs or scripts in response to the user computers 1305 and/or other servers 1315, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 1305 and/or another server 1315. In some embodiments, an application server can create web pages dynamically for displaying the information in accordance with embodiments of the invention, such as web pages for allowing an operator of an entity in a supply chain to view data related to the activation process, web pages transmitted to a wireless device during the activation process, and/or the like. Data provided by an application server may be formatted as web pages (comprising HTML, Javascript, etc., for example) and/or may be forwarded to a user computer 1305 via a web server (as described above, for example). Similarly, a web server might receive web page requests and/or input data from a user computer 1305 and/or forward the web page requests and/or input data to an application server. In some cases a web server may be integrated With an application server.

In accordance with further embodiments, one or more servers 1315 can function as a file server and/or can include one or more of the files (e.g., application code, data files, etc.) necessary to implement methods of the invention incorporated by an application running on a user computer 1305 and/or another server 1315. Alternatively, as those skilled in the art will appreciate, a file server can include all necessary files, allowing such an application to be invoked remotely by a user computer 1305 and/or server 1315. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320. The location of the database(s) 1320 is discretionary: merely by way of example, a database 1320a might reside on a storage medium local to (and/or resident in) a server 1315a (and/or a user computer 1305). Alternatively, a database 1320b can be remote from any or all of the computers 1305, 1315, so long as it can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the computers 1305, 1315 can be stored locally on the respective computer and/or remotely, as appropriate.) In one set of embodiments, the database 1335 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of providing a wireless device with occasional access to a wireless network, the method comprising:
   assigning an IMSI number to the wireless device, wherein the IMSI number falls within a pool of known IMSI numbers, and wherein the wireless device is not activated as a subscriber on the wireless network;
   providing, in the wireless network, a detection device configured to identify the wireless device;
   configuring the wireless network to identify the detection device as a quasi-home location register for the pool of known IMSI numbers;
   receiving, at a base station controller, a message from the wireless device, wherein the message comprises the IMSI number;
   identifying the IMSI number of the wireless device;
   based on the identification of the IMSI number, identifying the detection device as a quasi-home location register for the wireless device;
   receiving, at the detection device, a query from a mobile switching center ("MSC") for data pertaining to the wireless device;
   selecting, from a pool of temporary mobile subscriber international ISDN numbers ("MSISDN") maintained by the activation system, a temporary MSISDN for the wireless device;
   providing to the MSC, in response to the query, the temporary MSISDN assigned to the wireless device;
   receiving, at the detection device, a first location update request from a visited location register for a first subscriber profile for the wireless device;
   sending to the visited location register, in response to the first location update request, a message comprising the first subscriber profile for the wireless device;
   receiving, at the detection device, a second location update request from a service GPRS support node for a second subscriber profile for the wireless device;
   sending to the service GPRS support node, in response to the second location update request, a message comprising the second subscriber profile for the wireless device, the second subscriber profile to support one or more access point names;
   receiving data from the wireless device; and
   returning the temporary MSISDN to the pool of temporary MSISDNs, such that the temporary MSISDN can be selected for another wireless device.

2. The method of claim 1, wherein the step of providing the temporary MSISDN to the MSC comprises providing a notification that the wireless device is capable of communicating data over a specified bearer service, and wherein the data from the wireless device is received over the specified bearer service.

3. A method of providing a wireless device with occasional access to a wireless network, the method comprising:
   assigning an identification number to the wireless device, wherein the identification number falls within a pool of known identification numbers, and wherein the wireless device is not activated as a subscriber on the wireless network;
   providing, in the wireless network, a detection device configured to identify the wireless device;
   configuring the wireless network to identify the detection device as a quasi-home location register for the block of known identification numbers;
   receiving, at the detection device, a first location update request from a visited location register for a first subscriber profile for the wireless device
   assigning, at the detection device, a temporary mobile subscriber international ISDN ("MSISDN") to the wireless device, the MSISDN being selected from a pool of temporary MSISDN numbers;
   in response to the first location update request, providing the temporary MSISDN to the visited location register;
   receiving, at the detection device, a second location update request for a second subscriber profile for the wireless device;
   sending, in response to the second location update request, a message comprising the second subscriber profile for the wireless device;
   receiving data from the wireless device; and
   un-assigning the temporary MSISDN after the data has been received from the wireless device.

4. A method of activating a wireless device on a wireless network, the method comprising:
   assigning a first identification number to an identification module, wherein the identification number falls within a pool of known identification numbers, and wherein the identification module is not activated as a subscriber on the wireless network;
   providing, in the wireless network, a detection device configured to identify a wireless device associated with the identification module;

configuring the wireless network to identify the detection device as a quasi-home location register for the block of known identification numbers;

receiving, at the detection device, a first location update request from a visited location register for a first subscriber profile for the wireless device assigning, at the detection device, a temporary mobile subscriber international ISDN ("MSISDN") to the wireless device, the MSISDN being selected from a pool of temporary MSISDN numbers;

in response to the first location update request, providing the temporary MSISDN to the visited location register;

receiving, at the detection device, a second location update request for a second subscriber profile for the wireless device;

sending, in response to the second location update request, a message comprising the second subscriber profile for the wireless device;

receiving data from the wireless device; and un-assigning the temporary MSISDN after the data has been received from the wireless device.

5. The method of claim 4, wherein the identification module is a subscriber identity module ("SIM") card.

6. The method of claim 4, wherein the step of providing the temporary MSISDN to the visited location register comprises providing a notification that the wireless device is capable of communicating data over a specified bearer service, and wherein the data from the wireless device is received over the specified bearer service.

7. The method of claim 1, wherein assigning the IMSI number to the wireless device comprises assigning the IMSI number to a subscriber identity module ("SIM") card.

8. The method of claim 3, wherein the step of providing the temporary MSISDN to the visited location register comprises providing a notification that the wireless device is capable of communicating data over a specified bearer service, and wherein the data from the wireless device is received over the specified bearer service.

9. The method of claim 3, wherein assigning the IMSI number to the wireless device comprises assigning the IMSI number to a subscriber identity module ("SIM") card.

* * * * *